United States Patent
Nishita et al.

(10) Patent No.: US 12,128,784 B2
(45) Date of Patent: Oct. 29, 2024

(54) ENERGY MANAGEMENT SYSTEM AND ENERGY MANAGEMENT METHOD

(71) Applicant: Mitsubishi Electric Corporation, Tokyo (JP)

(72) Inventors: Yoshito Nishita, Tokyo (JP); Satoko Sakajo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 642 days.

(21) Appl. No.: 17/293,477

(22) PCT Filed: Feb. 4, 2019

(86) PCT No.: PCT/JP2019/003877
§ 371 (c)(1),
(2) Date: May 13, 2021

(87) PCT Pub. No.: WO2020/161773
PCT Pub. Date: Aug. 13, 2020

(65) Prior Publication Data
US 2022/0048399 A1 Feb. 17, 2022

(51) Int. Cl.
*G06Q 10/0631* (2023.01)
*B60L 53/62* (2019.01)
(Continued)

(52) U.S. Cl.
CPC ............. *B60L 53/64* (2019.02); *B60L 53/665* (2019.02); *G05B 19/042* (2013.01); *H02J 3/003* (2020.01);
(Continued)

(58) Field of Classification Search
CPC .... B60L 53/64; B60L 53/665; B60L 2260/54; B60L 2240/62; B60L 2240/80;
(Continued)

(56) References Cited

U.S. PATENT DOCUMENTS

2017/0005483 A1  1/2017 Miyake et al.

FOREIGN PATENT DOCUMENTS

CN       105659464 A    6/2016
JP       2012-80748 A   4/2012
(Continued)

OTHER PUBLICATIONS

International Search Report and Written Opinion mailed on Apr. 2, 2019, received for PCT Application PCT/JP2019/003877, Filed on Feb. 4, 2019, 7 pages including English Translation.
(Continued)

*Primary Examiner* — Charles R Kasenge
(74) *Attorney, Agent, or Firm* — XSENSUS LLP

(57) ABSTRACT

To create a charging/discharging plan when a vehicle including a storage battery is chargeable/dischargeable at a plurality of facilities. An energy management system includes a schedule management unit configured to manage a schedule for moving from a first facility to a second facility, and a charging/discharging plan creation unit configured to create a first charging/discharging plan being a charging/discharging plan for a storage battery in each of the first facility and the second facility, in which the charging/discharging plan creation unit is configured to create the first charging/discharging plan with which the storage battery discharges at the first facility while leaving moving power being power for the vehicle to move from the first facility to the second facility.

15 Claims, 33 Drawing Sheets

| EV NAME | EV STORAGE CAPACITY | CURRENT POWER STORAGE AMOUNT | MINIMUM VALUE OF CHARGEABLE /DISCHARGEABLE CAPACITY | MAXIMUM VALUE OF CHARGEABLE /DISCHARGEABLE CAPACITY | CHARGING /DISCHARGING EFFICIENCY |
|---|---|---|---|---|---|
| VEHICLE 1 | 30.0kWh | 9.0kWh | 4.5kWh | 30.0kWh | 100.0% |

(51) Int. Cl.
  *B60L 53/64* (2019.01)
  *B60L 53/66* (2019.01)
  *G05B 19/042* (2006.01)
  *G06Q 50/06* (2024.01)
  *H02J 3/00* (2006.01)
  *H02J 3/32* (2006.01)
  *H02J 7/00* (2006.01)

(52) U.S. Cl.
  CPC .............. *H02J 3/004* (2020.01); *H02J 3/322* (2020.01); *H02J 7/0071* (2020.01); *G05B 2219/25359* (2013.01); *G05B 2219/2637* (2013.01)

(58) Field of Classification Search
  CPC .............. B60L 2250/14; G05B 19/042; G05B 2219/25359; G05B 2219/2637; G05B 2219/2639; H02J 3/003; H02J 3/004; H02J 3/322; H02J 7/0071; H02J 3/008; H02J 2310/48; Y02T 10/70; Y02T 10/7072; Y02T 10/72; Y02T 90/12; Y02T 90/16; Y02T 90/167; Y04S 30/14
  See application file for complete search history.

(56) References Cited

FOREIGN PATENT DOCUMENTS

| | | | |
|---|---|---|---|
| JP | 2012080748 A | * | 4/2012 |
| JP | 2015-95983 A | | 5/2015 |
| JP | 2017-46421 A | | 3/2017 |

OTHER PUBLICATIONS

Office Action issued on Jul. 19, 2024, in corresponding Chinese patent Application No. 201980089755.4, 23 pages.

* cited by examiner

FIG. 2

| EV NAME | EV STORAGE CAPACITY | CURRENT POWER STORAGE AMOUNT | MINIMUM VALUE OF CHARGEABLE /DISCHARGEABLE CAPACITY | MAXIMUM VALUE OF CHARGEABLE /DISCHARGEABLE CAPACITY | CHARGING /DISCHARGING EFFICIENCY |
|---|---|---|---|---|---|
| VEHICLE 1 | 30.0kWh | 9.0kWh | 4.5kWh | 30.0kWh | 100.0% |

FIG. 3

| EV NAME | PLANNED ARRIVAL DATE | PLANNED ARRIVAL TIME | PLANNED DEPARTURE DATE | PLANNED DEPARTURE TIME | PLANNED ARRIVAL FACILITY | REQUIRED POWER AMOUNT |
|---|---|---|---|---|---|---|
| VEHICLE 1 | 2018/9/6 | 18:00 | 2018/9/7 | 07:00 | FACILITY 1 | 6.0kWh |
| VEHICLE 1 | 2018/9/7 | 08:00 | 2018/9/7 | 17:00 | FACILITY 2 | 6.0kWh |

F I G. 4

| FACILITY | CHARGING /DISCHARGING UNIT | MAXIMUM CHARGE POWER | MAXIMUM DISCHARGE POWER |
|---|---|---|---|
| FACILITY 1 | CHARGING UNIT 1 | 6.00kW | 6.00kW |
| FACILITY 2 | CHARGING UNIT 1 | 6.00kW | 6.00kW |

FIG. 16

| EV NAME | PLANNED ARRIVAL DATE | PLANNED ARRIVAL TIME | PLANNED DEPARTURE DATE | PLANNED DEPARTURE TIME | PLANNED ARRIVAL FACILITY |
|---|---|---|---|---|---|
| VEHICLE 1 | 2018/9/6 | 18:00 | 2018/9/7 | 07:00 | FACILITY 1 |
| VEHICLE 1 | 2018/9/7 | 08:00 | 2018/9/7 | 17:00 | FACILITY 2 |

FIG. 17

| ORIGIN | DESTINATION | POWER CONSUMPTION AMOUNT |
|---|---|---|
| FACILITY 1 | FACILITY 2 | 6.00kWh |
| FACILITY 2 | FACILITY 1 | 6.00kWh |

F I G. 1 8
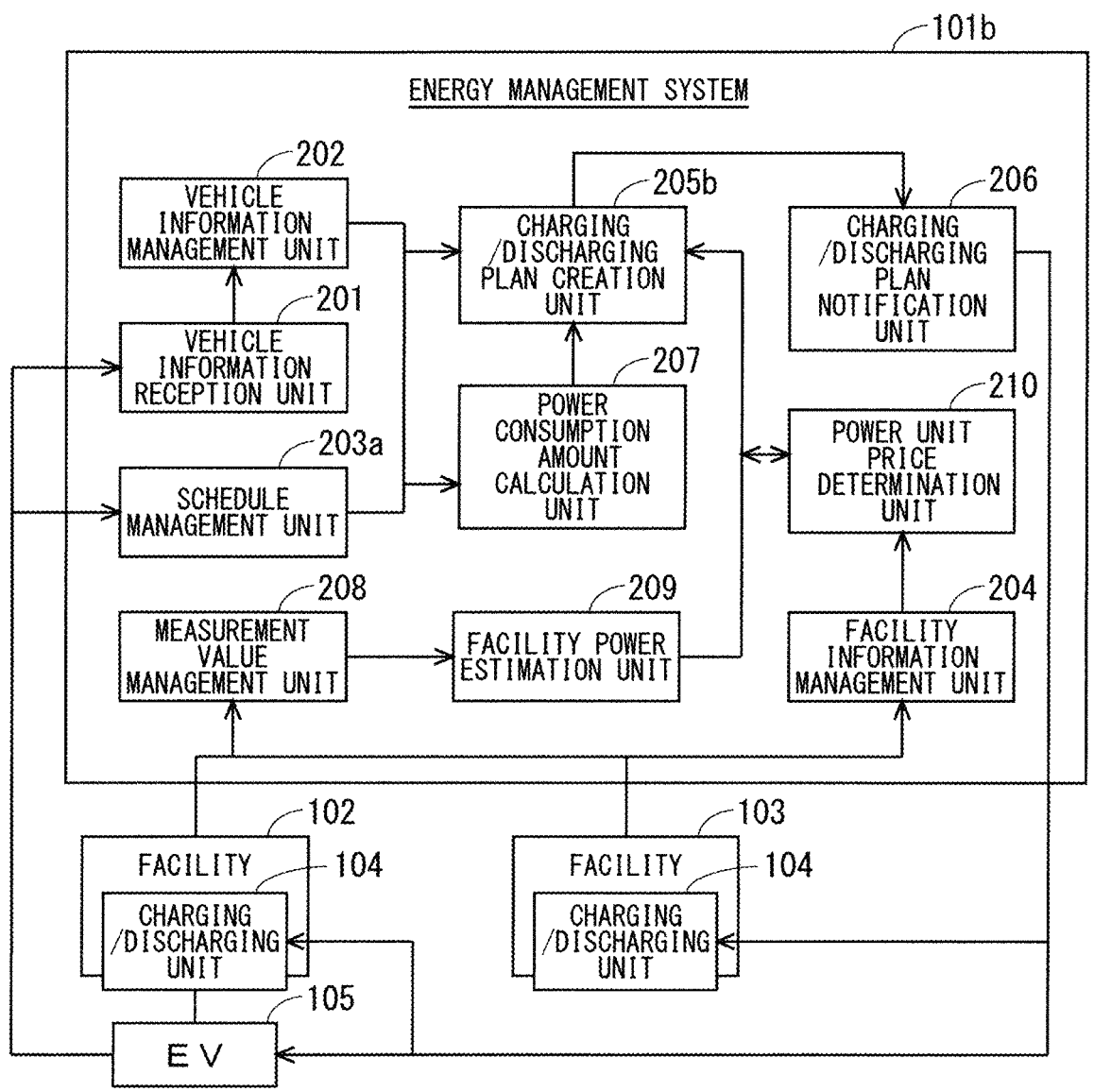

FIG. 25

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 |  |  |  |  |  |  |  |  |  |  |  |  |  |  |  |  |  |  |  |  |  |  |  |  |
| FACILITY 2 |  |  |  |  |  |  |  |  |  |  |  |  |  |  |  |  |  |  |  |  |  |  |  |  |

FIG. 26

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 | | | ▓ | ▓ | ▓ | ▓ | ▓ | ▓ | ▓ | ▓ | ▓ | ▓ | ▓ | ▓ | | | | | | | | | | |
| FACILITY 2 | | | | | | | | | | | | | | | | ▓ | ▓ | ▓ | ▓ | ▓ | ▓ | ▓ | ▓ | ▓ |

F I G. 27

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 | | ▒ | ▒ | ▒ | ▒ | ▒ | ▒ | ▒ | ▒ | ▒ | ▒ | ▒ | ▒ | | | | | | | | | | | |
| FACILITY 2 | | | | | | | | | | | | | | | ▒ | ▒ | ▒ | ▒ | ▒ | ▒ | ▒ | ▒ | ▒ | ▒ |

FIG. 28

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 | ▓ | ▓ | ▓ | ▓ | ▓ | ▓ | ▓ | ▓ | ▓ | ▓ | ▓ | ▓ | ▓ | ▓ | | | | | | | | | | |
| FACILITY 2 | | | | | | | | | | | | | | | | ▓ | ▓ | ▓ | ▓ | ▓ | ▓ | ▓ | ▓ | ▓ |

FIG. 29

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 | | | ▓ | ▓ | ▓ | ▓ | ▓ | ▓ | ▓ | ▓ | ▓ | ▓ | ▓ | ▓ | ▓ | | | | | | | | | |
| FACILITY 2 | | | | | | | | | | | | | | | | | ▓ | ▓ | ▓ | ▓ | ▓ | ▓ | ▓ | ▓ |

FIG. 30

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 |  | ▓ | ▓ | ▓ | ▓ | ▓ | ▓ | ▓ | ▓ | ▓ | ▓ | ▓ | ▓ | ▓ | ▓ | ▓ |  |  |  |  |  |  |  |  |
| FACILITY 2 |  |  |  |  |  |  |  |  |  |  |  |  |  |  |  |  |  | ▓ | ▓ | ▓ | ▓ | ▓ | ▓ | ▓ |

FIG. 31

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 | ▓ | ▓ | ▓ | ▓ | ▓ | ▓ | ▓ | ▓ | ▓ | ▓ | ▓ | ▓ | ▓ | ▓ | ▓ |  |  |  |  |  |  |  |  |  |
| FACILITY 2 |  |  |  |  |  |  |  |  |  |  |  |  |  |  |  |  | ▓ | ▓ | ▓ | ▓ | ▓ | ▓ | ▓ | ▓ |

FIG. 32

| TIME OF DAY t | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|
| FACILITY 1 | ■ | ■ | ■ | ■ | ■ | ■ | ■ | ■ | ■ | ■ | ■ | ■ | ■ | ■ | ■ | ■ | | | | | | | | |
| FACILITY 2 | | | | | | | | | | | | | | | | | | ■ | ■ | ■ | ■ | ■ | ■ | ■ |

FIG. 33

| EV NAME | PLANNED ARRIVAL DATE | PLANNED ARRIVAL TIME | PLANNED DEPARTURE DATE | PLANNED DEPARTURE TIME | PLANNED ARRIVAL FACILITY | POWER COST ACCORDING TO SETTING SCHEDULE | POWER COST ACCORDING TO CHANGE OF SCHEDULE | DIFFERENCE |
|---|---|---|---|---|---|---|---|---|
| VEHICLE 1 | 2018/9/6 | 19:00 | 2018/9/7 | 07:00 | FACILITY 1 | 300 YEN | 250 YEN | 50 YEN |
| VEHICLE 1 | 2018/9/7 | 08:00 | 2018/9/7 | 18:00 | FACILITY 2 | | | |

ENERGY MANAGEMENT SYSTEM AND ENERGY MANAGEMENT METHOD

CROSS-REFERENCE TO RELATED APPLICATION

The present application is based on PCT filing PCT/JP2019/003877, filed Feb. 4, 2019, the entire contents of which are incorporated herein by reference.

TECHNICAL FIELD

The techniques disclosed in the present specification relate to an energy management system and an energy management method.

BACKGROUND ART

In recent years, vehicles such as electric vehicles (i.e. EVs) or plug-in hybrid vehicles (i.e. PHVs) equipped with storage batteries have become prevalent.

In addition, a charging/discharging unit for utilizing a storage battery mounted on a vehicle as a power facility for supplying power to facilities such as commercial buildings, complex buildings or business offices, or an energy management system for controlling charging/discharging of the storage battery mounted on the vehicle has been under development.

For example, in the technique disclosed in Patent Document 1, charging/discharging of a storage battery is controlled such that a required charge amount, which is the charge amount required for traveling, based on an EV schedule information is calculated, and comparison between the remaining charge amount in the battery and the required charge amount is performed, and when the required charge amount is higher than the remaining charge amount, charging of the required charge amount is performed in the period during which the price of buying power is low, and meanwhile, when the required charge amount is lower than the remaining charge amount, discharging of the excess charge is performed in the period during which the price of buying power is high.

Further, for example, in the technique disclosed in Patent Document 2, the target value of the charging/discharging of the battery (EV battery) mounted on an EV is calculated in the midnight time zone during which the price of buying power is low and the non-midnight time zone during which the price of buying power is high, respectively. Then, the charging/discharging control of the storage battery is disclosed, which controls the charge amount to be the target value or greater in the midnight time zone and controls the discharge amount not to fall below the target value in the non-midnight time zone.

PRIOR ART DOCUMENTS

Patent Documents

[Patent Document 1] Japanese Patent Application Laid-Open No. 2015-95983
[Patent Document 2] Japanese Patent Application Laid-Open No. 2017-46421

SUMMARY

Problem to be Solved by the Invention

However, in the techniques in Patent Document 1 and Patent Document 2, the number of facilities the EV is connected to is one. And such a charging/discharging plan with which a vehicle having a storage battery is chargeable/dischargeable at a plurality of facilities has not been considered.

A technique disclosed in the present specification has been made in view of the above-mentioned problems, and is for creating a charging/discharging plan with which a vehicle having a storage battery chargeable/dischargeable at a plurality of facilities.

Means to Solve the Problem

A first aspect of the technique disclosed in the present specification is an energy management system for managing charging/discharging of a storage battery of a vehicle equipped with the storage battery, the energy management system includes a schedule management unit configured to manage a schedule for the vehicle to move from a first facility being a facility at which the storage battery is chargeable/dischargeable, to a second facility being a facility at which the storage battery is chargeable/dischargeable, and a charging/discharging plan creation unit configured to create a first charging/discharging plan being a charging/discharging plan for the storage battery in each of the first facility and the second facility, in which the charging/discharging plan creation unit is configured to create the first charging/discharging plan with which the storage battery discharges at the first facility while leaving moving power being power for the vehicle to move from the first facility to the second facility.

Further a second aspect of the technique disclosed in the present specification is an energy management method of managing charging/discharging of a storage battery of a vehicle equipped with the storage battery, the energy management method includes managing a schedule for the vehicle to move from a first facility being a facility at which the storage battery is chargeable/dischargeable, to a second facility being a facility at which the storage battery is chargeable/dischargeable, creating a first charging/discharging plan being a charging/discharging plan for the storage battery in each of the first facility and the second facility, and the first charging/discharging plan is created so that the storage battery discharges at the first facility while leaving moving power being power for the vehicle to move from the first facility to the second facility.

Effects of the Invention

The first aspect of the technique disclosed in the present specification is an energy management system for managing charging/discharging of a storage battery of a vehicle equipped with the storage battery, the energy management system includes a schedule management unit configured to manage a schedule for the vehicle to move from a first facility being a facility at which the storage battery is chargeable/dischargeable, to a second facility being a facility at which the storage battery is chargeable/dischargeable, and a charging/discharging plan creation unit configured to create a first charging/discharging plan being a charging/discharging plan for the storage battery in each of the first facility and the second facility, in which the charging/discharging plan creation unit is configured to create the first charging/discharging plan with which the storage battery discharges at the first facility while leaving moving power being power for the vehicle to move from the first facility to the second facility. According to such a configuration, a charging/discharging plan when a vehicle including a storage battery is chargeable/dischargeable at a plurality of facilities is created.

Further the second aspect of the technique disclosed in the present specification is an energy management method of managing charging/discharging of a storage battery of a vehicle equipped with the storage battery, the energy management method includes managing a schedule for the vehicle to move from a first facility being a facility at which the storage battery is chargeable/dischargeable, to a second facility being a facility at which the storage battery is chargeable/dischargeable, creating a first charging/discharging plan being a charging/discharging plan for the storage battery in each of the first facility and the second facility, and the first charging/discharging plan is created so that the storage battery discharges at the first facility while leaving moving power being power for the vehicle to move from the first facility to the second facility. According to such a configuration, a charging/discharging plan when a vehicle including a storage battery is chargeable/dischargeable at a plurality of facilities is created.

The objects, characteristics, aspects, and advantages of the technique disclosed in the present specification will become more apparent from the following detailed description and the accompanying drawings.

BRIEF DESCRIPTION OF DRAWINGS

FIG. 2 A table illustrating an example of information managed by a vehicle information management unit.

FIG. 3 A table illustrating an example of a usage schedule managed by a schedule management unit.

FIG. 4 A table illustrating an example of equipment information of a charging/discharging unit managed by a facility information management unit.

FIG. 16 A table illustrating an example of a usage schedule managed by a schedule management unit.

FIG. 17 A table illustrating an example of the power consumption amount calculated by a power consumption amount calculation unit.

FIG. 18 A block diagram illustrating a more specific configuration of an energy management system according to Embodiment.

FIG. 25 A table illustrating an example of a change of usage schedule by the presentation charging/discharging plan creation unit.

FIG. 26 A table illustrating an example of a change of usage schedule by the presentation charging/discharging plan creation unit.

FIG. 27 A table illustrating an example of a change of usage schedule by the presentation charging/discharging plan creation unit.

FIG. 28 A table illustrating an example of a change of usage schedule by the presentation charging/discharging plan creation unit.

FIG. 29 A table illustrating an example of a change of usage schedule by the presentation charging/discharging plan creation unit.

FIG. 30 A table illustrating an example of a change of usage schedule by the presentation charging/discharging plan creation unit.

FIG. 31 A table illustrating an example of a change of usage schedule by the presentation charging/discharging plan creation unit.

FIG. 32 A table illustrating an example of a change of usage schedule by the presentation charging/discharging plan creation unit.

FIG. 33 A table illustrating an example of a usage schedule presented to an EV user.

DESCRIPTION OF EMBODIMENTS

Figure 1:
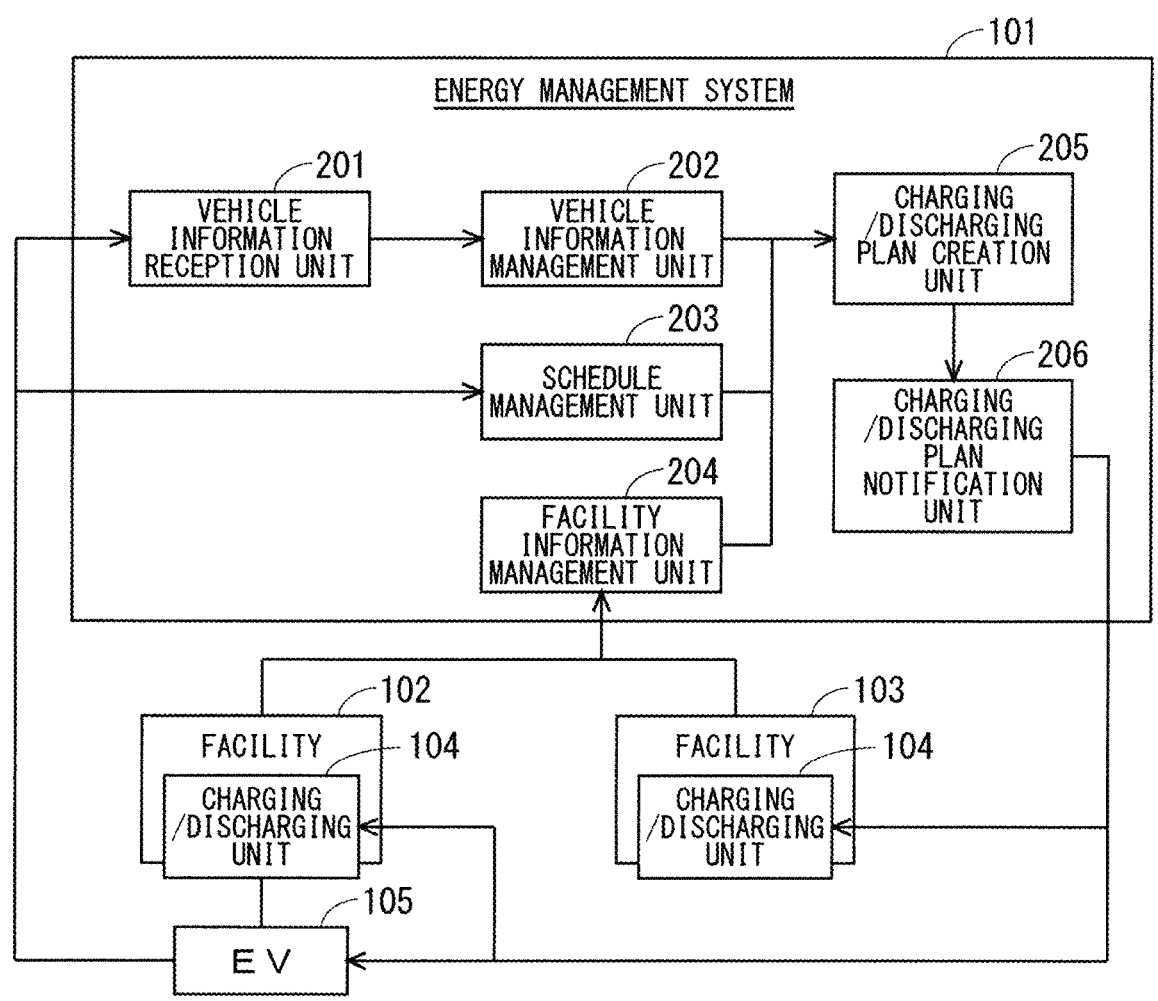
FIG. 1 A block diagram illustrating a more specific configuration of an energy management system according to Embodiment.

Hereinafter, Embodiments will be described with reference to the attached drawings. In following Embodiments, although detailed features and the like will also be illustrated for the purpose of describing the technique, the features and the like are examples, and not all of them are necessarily essential features in order for Embodiments to be feasible.

It should be noted that the drawings are schematically illustrated and, therefore, the configurations are appropriately omitted or simplified in the drawings for facilitating the description. Also, the mutual relationship among sizes and positions in configurations and the like illustrated in different drawings are not necessarily accurately described, and may be changed as appropriate. In addition, in the drawings such as plan views that are not cross-sectional views, hatching may be given to facilitate understanding of the contents of Embodiments.

In addition, in the following description, the same components are denoted by the same reference numerals, and the names and functions thereof are also similar. Accordingly, detailed descriptions thereof may be omitted to avoid redundancy.

Also, in the following description, even though ordinal numbers such as "first", and "second" may be used, these terms are for promoting the understanding of the contents of Embodiments and are not for defining the order caused by such ordinal numbers.

<Conceptual Configuration of Energy Management System>

Figure 36:
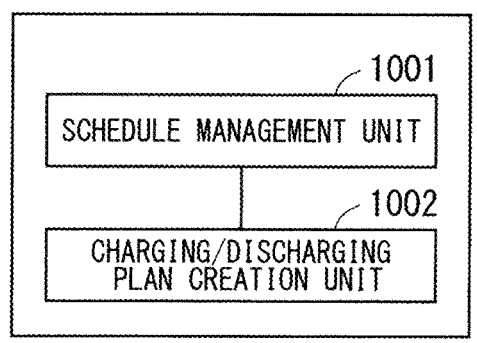
FIG. 36 A block diagram conceptually illustrating an example of the configuration of the energy management system according to present Embodiments.

FIG. 36 is a block diagram conceptually illustrating an example of the configuration of the energy management system according to present Embodiments.

As an example illustrated in FIG. 36, the energy management system includes a schedule management unit 1001 and a charging/discharging plan creation unit 1002.

The schedule management unit 1001 is a functional unit that manages a schedule for a vehicle to move from a first facility being a facility where a storage battery is chargeable/dischargeable to a second facility being a facility where the storage battery is chargeable/dischargeable. The charging/discharging plan creation unit 1002 is a functional unit that creates a first charging/discharging plan being a plan for charging/discharging the storage battery at each of the first facility and the second facility.

Then, the charging/discharging plan creation unit 1002 creates the first charging/discharging plan with which the storage battery discharges at the first facility while leaving moving power being the power for a vehicle to move from the first facility to the second facility.

In following Embodiments, although an EV is exemplified as a vehicle equipped with a storage battery, the vehicle equipped with the storage battery is not limited to an EV, and includes, for example, a vehicle such as a PHV.

Embodiment 1

Hereinafter, an energy management system and an energy management method according to Embodiment 1 will be described.

<Configuration of Energy Management System>

FIG. 1 is a block diagram illustrating a more specific configuration of an energy management system according to Embodiment 1.

As an example illustrated in FIG. 1, an energy management system 101 is in a state of being able to communicate with facilities 102 and 103. The facility 102 is, for example, a home. Also, the facility 103 is, for example, a building of workplace or the like. And, each of the facilities 102 and 103 holds a charging/discharging unit 104 for charging/discharging the EV battery. Although the charging/discharging unit 104 in each facility is denoted by the same reference numeral, the performance of respective charging/discharging units 104 (for example, the minimum value and the maximum value of the chargeable/dischargeable capacity) may differ.

The energy management system 101 includes a vehicle information reception unit 201 that receives vehicle information being information indicating the storage capacity (EV storage capacity) or the chargeable/dischargeable capacity of the EV battery, a vehicle information management unit 202 that manages the vehicle information, a schedule management unit 203 that manages a planned connection facility, to which an EV user plans to connect an EV 105, a planned connection time, at which the EV user plans to connect the EV 105, a planned disconnection time, at which the EV user plans to disconnect the EV 105, or a usage schedule including the power amount required for the EV 105 to move among a plurality of facilities, a facility information management unit 204 that manages facility information being information including power unit price information such as a buying power unit price and a selling power unit price at each time of day at the planned connection facility, a charging/discharging plan creation unit 205 that creates a charging/discharging plan for the EV battery in each facility, the charging/discharging plan being for keeping the total power cost taken for charging/discharging the EV battery low while securing the required power amount for the EV 105 to travel based on vehicle information, facility information and the usage schedule, and a charging/discharging plan notification unit 206 that notifies the created charging/discharging plan to the EV 105, the charging/discharging unit of each facility, or a controller that notifies the charging/discharging unit of the control value.

First, the vehicle information reception unit 201 will be described. The vehicle information reception unit 201 acquires the current vehicle information being information such as the current storage amount (current storage amount) of the EV battery or the current charging/discharging power, from the EV 105.

Next, the vehicle information management unit 202 will be described. The vehicle information management unit 202 manages vehicle information being information including an EV storage capacity, a chargeable/dischargeable capacity, and a charging/discharging efficiency, in addition to the current vehicle information acquired by the vehicle information reception unit 201.

FIG. 2 is a table illustrating an example of information managed by a vehicle information management unit 202. As an example illustrated in FIG. 2, in the vehicle information management unit 202, name of EV, EV storage capacity, current power storage amount, minimum value of chargeable/dischargeable capacity, maximum value of chargeable/dischargeable capacity, and charging/discharging efficiency are managed.

In the example in FIG. 2, the name of EV is "vehicle 1", the EV storage capacity is "30.0 kWh", the current power storage amount is "9.0 kWh", and the minimum value of chargeable/dischargeable capacity is "4.5 kWh", the maximum value of chargeable/dischargeable capacity is "30.0 kWh", and the charging/discharging efficiency is "100%".

Next, the schedule management unit 203 will be described. In the schedule management unit 203, a planned arrival time, at which an EV user plans for EV 105 to arrive, a planned departure time, at which the EV user plans for EV 105 to depart, a planned arrival facility, to which the EV user plans for EV 105 to arrive, or the usage schedule including the power amount (required power amount) required for the EV 105 to move among a plurality of facilities is managed.

That is, the schedule management unit 203 manages the schedule for the EV 105 to move among a plurality of facilities. Here, the planned arrival time may be replaced with the planned connection time. Also, the planned departure time may be replaced with the planned disconnection time. Further, the planned arrival facility may be replaced with the planned connection facility.

The above usage schedule is registered through a dedicated application for setting the usage schedule. The dedicated application used when setting the usage schedule may be a function of a satellite navigation system, an application available through a mobile terminal, or the like.

FIG. 3 is a table illustrating an example of the usage schedule managed by the schedule management unit 203. As an example illustrated in FIG. 3, in the schedule management unit 203, a planned arrival date, on which the EV user plans for EV 105 to arrive, the planned arrival time, a planned departure date, on which the EV user plans for EV 105 to depart, the planned departure time, the planned arrival facility, and the required power amount are managed.

In the example in FIG. 3, as one schedule, a case is managed in which the planned arrival date is "2018/9/6", the planned arrival time is "18:00", the planned departure date is "2018/9/7", the planned departure time is "07:00", the planned arrival facility is a "facility 1", and the required power amount is "6.0 kWh" is managed.

Also in the example in FIG. 3, as an other schedule, a case is managed in which the planned arrival date is "2018/9/7", the planned arrival time is "08:00", the planned departure date is "2018/9/7", the planned departure time is "17:00", the planned arrival facility is a "facility 2", and the required power amount is "6.0 kWh" is managed.

Next, the facility information management unit 204 will be described. In the facility information management unit 204, the equipment information of the charging/discharging unit held by each facility (that is, planned connection facilities) such as a home or a factory of which the charging/discharging unit the EV user plans to connect to is also managed as the facility information.

FIG. 4 is a table illustrating an example of the equipment information of a charging/discharging unit managed by the facility information management unit 204. As an example illustrated in FIG. 4, in the facility information management unit 204, names of planned connection facilities, names of charging/discharging units held by the planned connection facilities, maximum charge power of charging/discharging units held by the planned connection facilities, and maximum discharge power of the charging/discharging units held by the planned connection facilities are managed.

In an example of FIG. 4, a case is managed in which the name of planned connection facility is the "facility 1", the names of charging/discharging unit held by the planned connection facility is a "charging/discharging unit 1", the maximum charge power of the charging/discharging unit held by the planned connection facility is "6.00 kW", and maximum discharge power of the charging/discharging unit held by the planned connection facility is "6.00 kW", as one facility information.

Also in an example of FIG. 4, a case is managed in which the name of planned connection facility is the "facility 2", the names of charging/discharging unit held by the planned connection facility is the "charging/discharging unit 1", the maximum charge power of the charging/discharging unit held by the planned connection facility is "6.00 kW", and maximum discharge power of the charging/discharging unit held by the planned connection facility is "6.00 kW", as an other facility information.

Also, the facility information management unit 204 manages the purchasing power unit price at each time of day of each planned connection facility. Then, the facility information management unit 204 determines and manages the buying power unit price and the selling power unit price for charging/discharging the EV battery based on the purchasing power unit price.

Here, buying power indicates to buy power supplied by the discharge from the EV battery, and selling power indicates to sell power for charging the EV battery.

Figure 5:
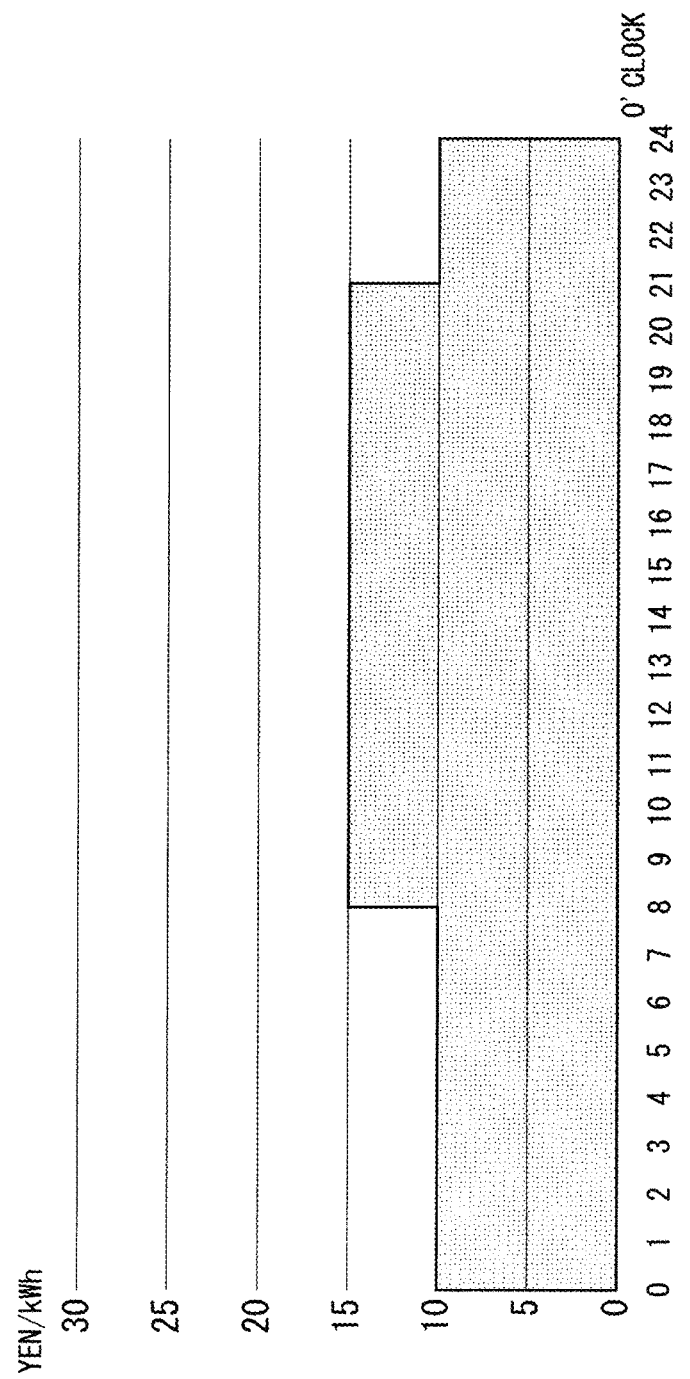
FIG. 5 A diagram illustrating an example of facility information managed by the facility information management unit.
Figure 6:
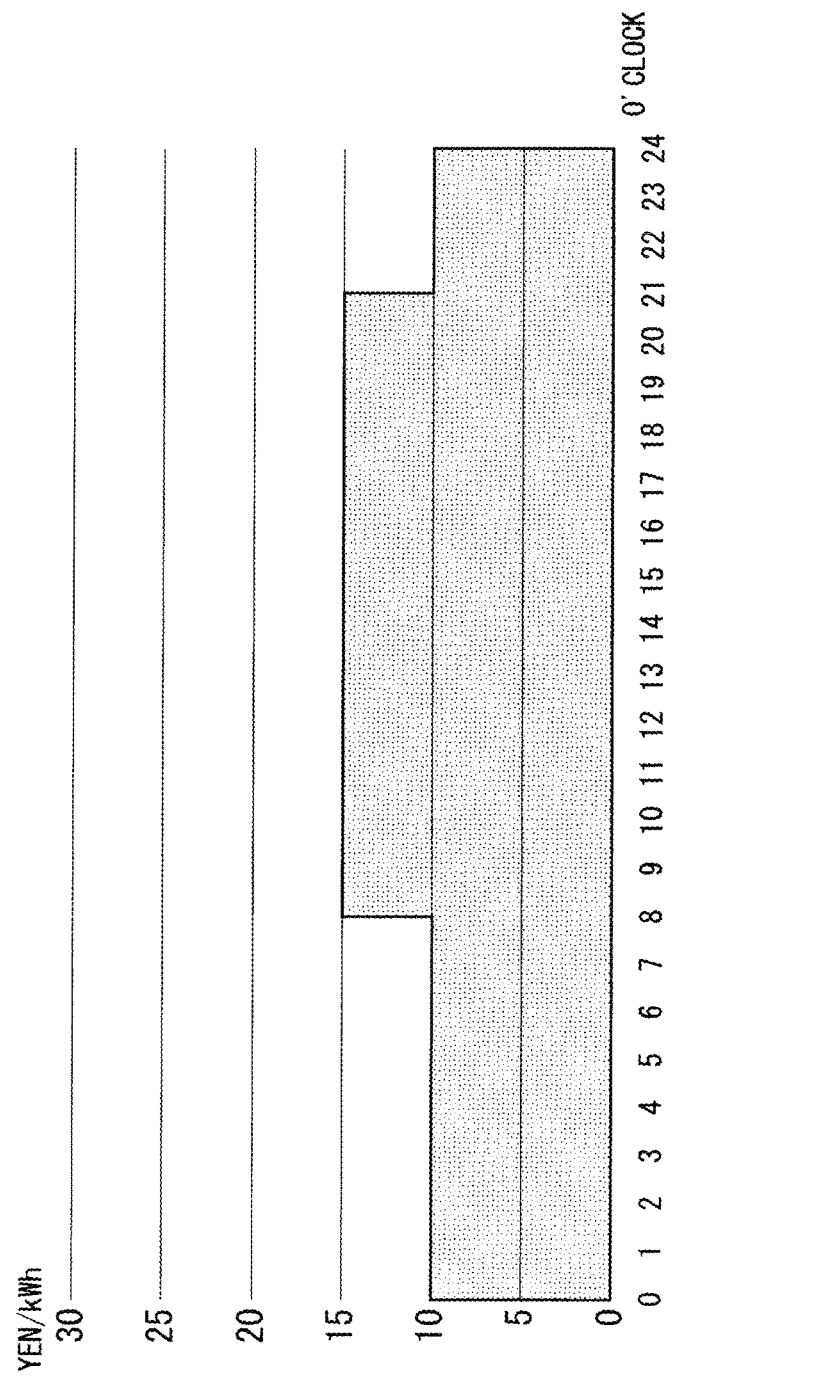
FIG. 6 A diagram illustrating an example of facility information managed by the facility information management unit.
Figure 7:
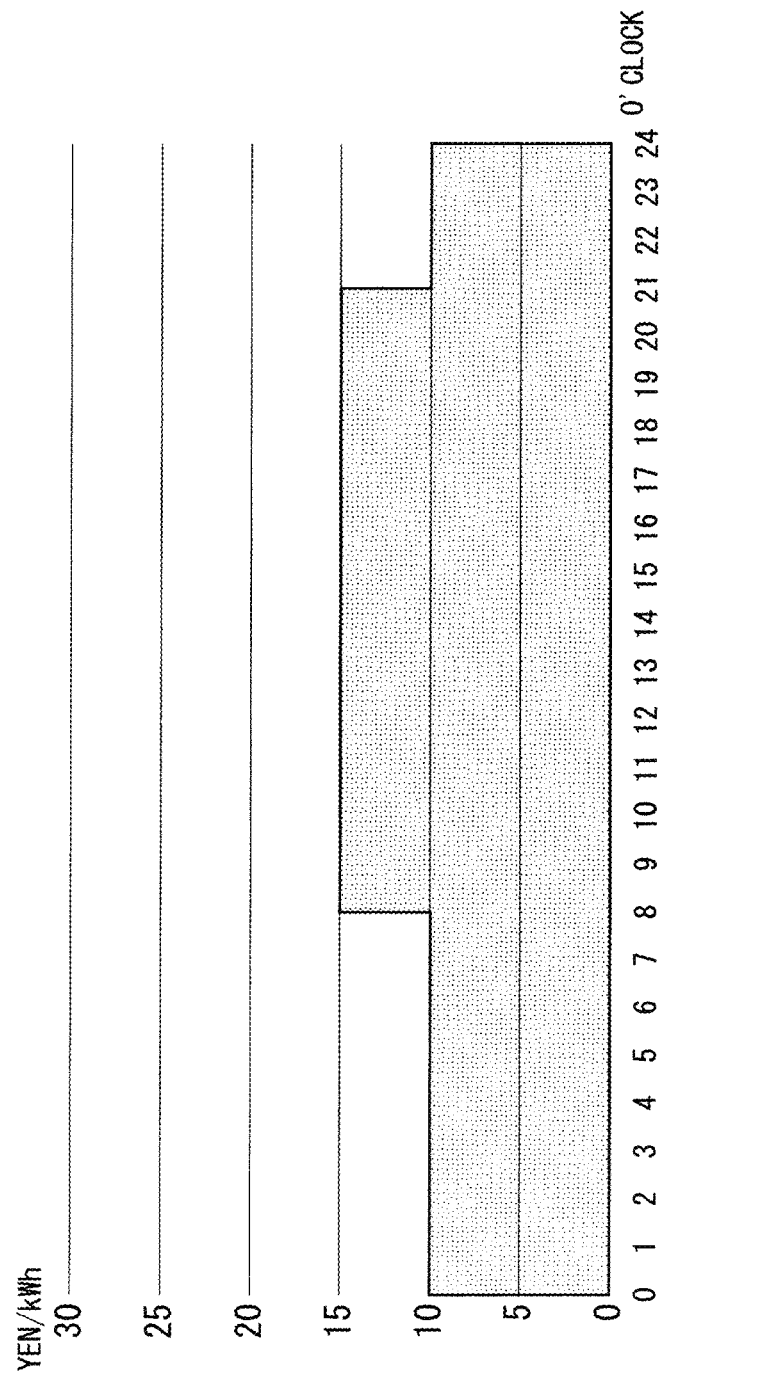
FIG. 7 A diagram illustrating an example of facility information managed by the facility information management unit.

FIGS. 5, 6 and 7 are diagrams illustrating an example of the facility information managed by the facility information management unit 204. FIG. 5 illustrates an example of purchasing power unit price of the facility 1 at each time of day, FIG. 6 illustrates an example of buying power unit price of the facility 1 at each time of day, and FIG. 7 illustrates an example of selling power unit price of the facility 1 at each time of day. In FIGS. 5, 6 and 7, the vertical axis represents the power unit price [yen/kWh], and the horizontal axis represents the time of day [o'clock].

In the time zone from 8:00 to 21:00 at the facility 1, as an example illustrated in FIGS. 5, 6 and 7, the purchasing power unit price rises from 10 [yen/kWh] to 15 [yen/kWh], the buying power unit price rises from 10 [yen/kWh] to 15 [yen/kWh], and the selling power unit price rises from 10 [yen/kWh] to 15 [yen/kWh].

Figure 8:
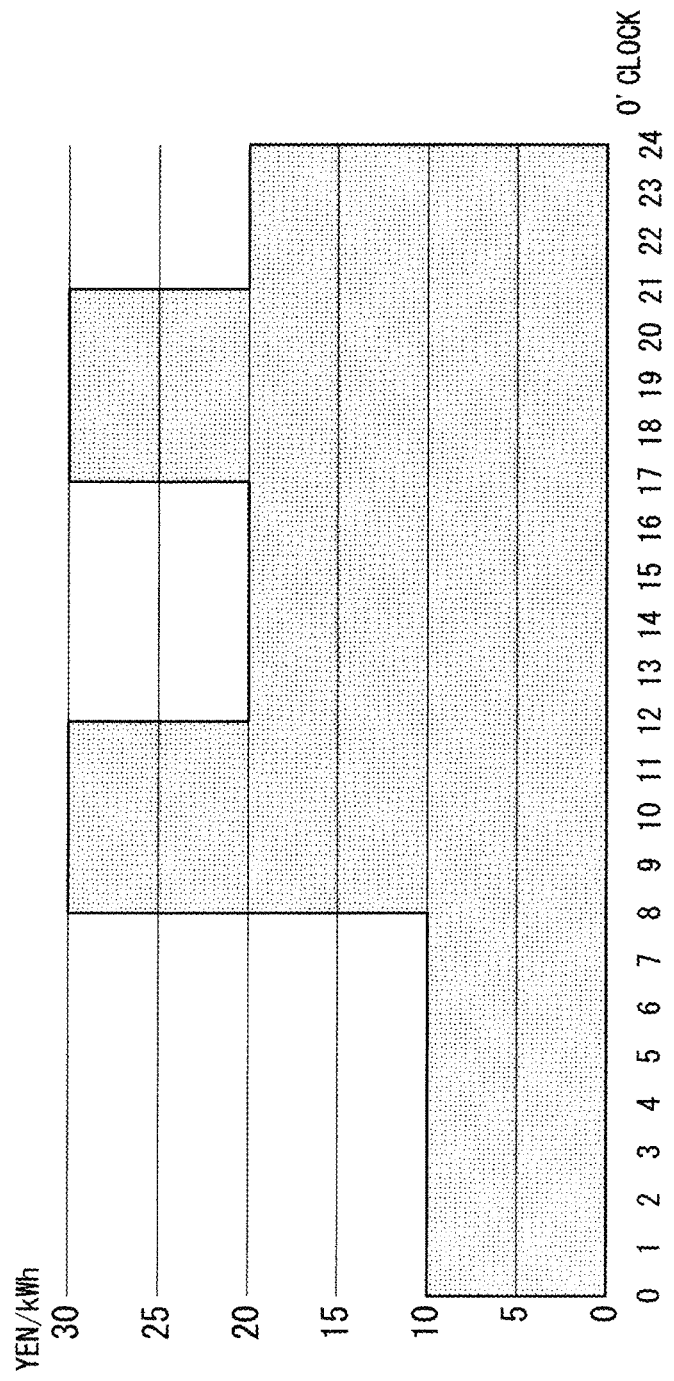
FIG. 8 A diagram illustrating an example of facility information managed by the facility information management unit.
Figure 9:
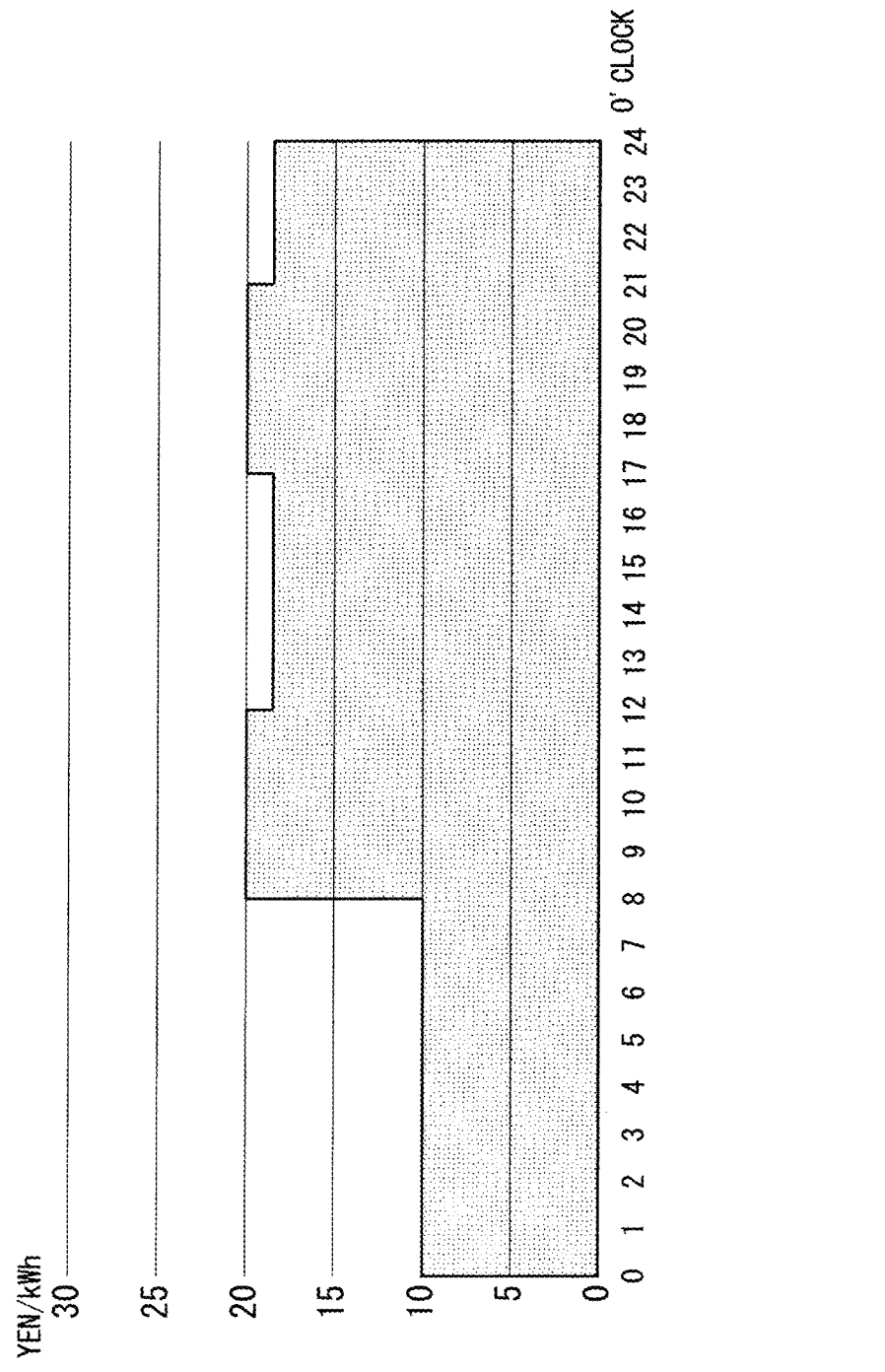
FIG. 9 A diagram illustrating an example of facility information managed by the facility information management unit.
Figure 10:
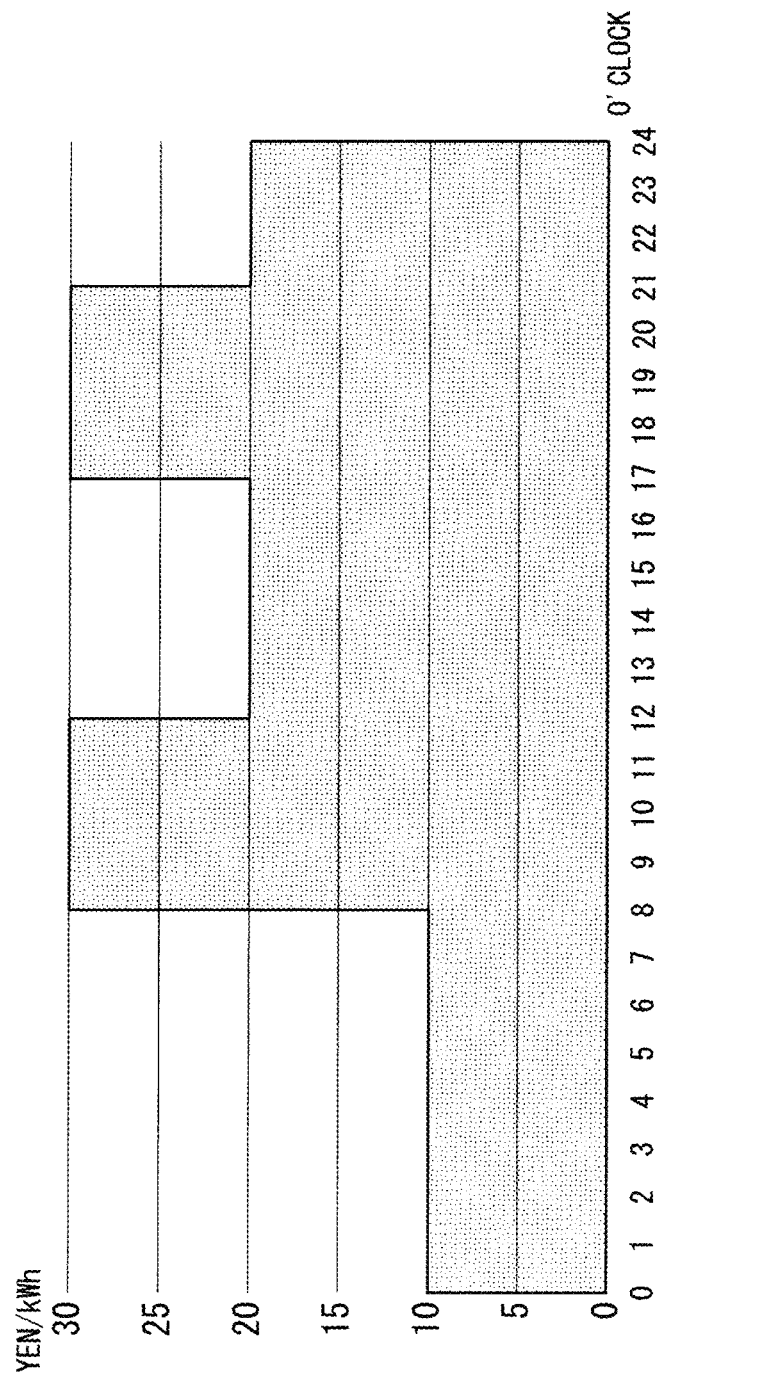
FIG. 10 A diagram illustrating an example of facility information managed by the facility information management unit.

FIGS. 8, 9 and 10 are diagrams illustrating an example of the facility information managed by the facility information management unit 204. FIG. 8 illustrates an example of purchasing power unit price of the facility 2 at each time of day, FIG. 9 illustrates an example of buying power unit price of the facility 2 at each time of day, and FIG. 10 illustrates an example of selling power unit price of the facility 2 at each time of day. In FIGS. 8, 9 and 10, the vertical axis represents the power unit price [yen/kWh], and the horizontal axis represents the time of day [o'clock].

In the time zone from 0:00 to 8:00 at the facility 2, as an example illustrated in FIGS. 8, 9 and 10, the purchasing power unit price is 10 [yen/kWh], the buying power unit price is 10 [yen/kWh], and the selling power unit price is 10 [yen/kWh]. In the time zone from 8:00 to 12:00 at the facility 2, the purchasing power unit price is 30 [yen/kWh], the buying power unit price is 20 [yen/kWh], and the selling power unit price is 30 [yen/kWh].

And in the time zone from 12:00 to 17:00 at the facility 2, the purchasing power unit price is 20 [yen/kWh], the buying power unit price is 18 [yen/kWh], and the selling power unit price is 20 [yen/kWh]. Further, in the time zone from 17:00 to 21:00 at the facility 2, the purchasing power unit price is 30 [yen/kWh], the buying power unit price is 20 [yen/kWh], and the selling power unit price is 30 [yen/kWh].

Further, in the time zone from 21:00 to 24:00 at the facility 2, the purchasing power unit price is 20 [yen/kWh], the buying power unit price is 18 [yen/kWh], and the selling power unit price is 20 [yen/kWh].

Further, information on incentives for discharging (selling power) may be included as the facility information managed by the facility information management unit 204, in addition to the buying power unit price or the selling power unit price.

Examples of the above incentives may include, for example, amount paid to the EV user, which varies at each time of day, in a case where the planned connection facility is a shopping facility such as a department store or a shopping mall, a discount coupon such as a coupon valid in the planned connection facility (the coupon may be available only on a specific date and time), in a case where the planned connection facility is a commuting destination of the EV user such as a factory or office, the electricity charge the EV user is supposed to pay for charging the EV battery, and a certain amount of commuting allowance.

Next, the charging/discharging plan creation unit 205 will be described. Based on the vehicle information managed by the vehicle information management unit 202, the usage schedule managed by the schedule management unit 203, and the power unit price information for each planned connection facility included in the facility information managed by the facility information management unit 204, in the charging/discharging plan creation unit 205, the charging/discharging plan for the EV battery in each facility is created with which the total power cost taken for charging/discharging the EV battery is made minimum while securing the required power amount (that is, required power amount on departure) for the EV 105 to travel, within a range of the chargeable/dischargeable capacity of the EV battery.

For example, in a case where the facility information managed by the facility information management unit 204 is the buying power unit price and the selling power unit price of the planned connection facilities, the charging/discharging plan for the EV battery in each facility created by the charging/discharging plan creation unit 205 is a charging/discharging plan that includes charging the required power amount for the EV 105 to travel, first, within a period during which the EV 105 is connected to the planned connection facility and in a time zone in which the selling power unit price is low. Alternatively, assuming that the EV battery discharges within a period in which the EV 105 is connected to the planned connection facility and in a time zone in which the buying power unit price is high, the charging/discharging plan is a charging/discharging plan that includes charging equal to or greater than the required power amount for the EV 105 to travel (for example, up to the maximum chargeable capacity) within a period during which the EV 105 is connected to the planned connection facility and in a time zone in which the selling power unit price is low.

Then, the above charging/discharging plan is a charging/discharging plan that further includes, while the required power amount for the EV 105 to travel is being left, discharging power other than the required power amount for the EV 105 to travel store in the EV battery, within a period during which the EV 105 is connected to the planned connection facility and in a time zone in which the buying power unit price is high.

Specifically, the charging/discharging plan creation unit 205 calculates the charging/discharging plan for each time of day at regular intervals (for example, an one-hour interval) for a certain period from the time of plan creation (for example, up to 24 hours ahead).

At that time, the charging/discharging plan creation unit 205 creates a charging/discharging plan within a range of the maximum charge power and the maximum discharge power amount of the charging/discharging unit of each planned connection facility managed by the facility information management unit 204, by setting the current power storage amount of the EV battery at the time of plan creation managed by the vehicle information management unit 202 to an initial value so as to secure a capacity (power storage amount) equal to or greater than the required power amount for the EV 105 to move between facilities by the planned departure time for the EV 105 at each facility managed by the schedule management unit 203, within the range between the minimum value of the chargeable/dischargeable capacity and the maximum value of the chargeable/dischargeable capacity of the EV battery similarly managed by the vehicle information management unit 202.

However, if the capacity (power storage amount) cannot be secured up to the required power amount for the EV 105 to move between facilities due to restrictions on the EV 105 or the equipment of the charging/discharging unit, the charging/discharging plan creation unit 205 creates a charging/discharging plan with which power storage amount of the EV battery approaches the required power amount as much as possible.

When there are a plurality of charging/discharging plans satisfying the above conditions, the charging/discharging plan creation unit 205 can select, from the charging/discharging plans, a charging/discharging plan that minimizes the value obtained by subtracting the discharging profit generated by discharging from the charging cost generated by charging, which is calculated based on the buying power unit price and selling power unit price at each time of day of the planned connection facility.

As one of the calculation methods of the above charging/discharging plan by the charging/discharging plan creation unit 205, there is a method in which the charging/discharging plan is calculated by representing the above conditions by an expression as a constraint condition and an objective function of the optimization problem, and solving the optimization problem using an optimization solver.

An example of representation of the above condition by an expression will be described below.

Noted that, t in following Expression 1 represents an index of one cycle in a case where a plan creation period (t=T (for example, 24 hours)) from the plan creation time (t=0) is divided by a fixed cycle (for example, 1 hour).

Also, i in following Expression 1 represents an index of F facilities being planned connection facilities.

First, as a constraint condition, a range between the minimum value of the chargeable/dischargeable capacity and the maximum value of the chargeable/dischargeable capacity of the EV battery is represented by an expression as indicated in following Expression (1).

[Expression 1]

$$SOC\_MIN \leq SOC(t) \leq SOC\_MAX \qquad (1)$$

Here, SOC in Expression (1) represents the power storage amount of the EV battery at time of day t. Also, SOC_MIN represents the minimum value of the chargeable/dischargeable capacity of the EV battery. Also, SOC_MAX represents the maximum value of the chargeable/dischargeable capacity of the EV battery.

In calculating the charging/discharging plan, the power storage amount of the EV battery changes depending on the charging/discharging plan at each time of day. The change is represented by an expression as indicated in following Expression (2).

[Expression 2]

$$SOC(t)=SOC(t-1)+EFF \cdot (E\_EV\_DISCHARGE(t)-E\_EV\_CHARGE(t)) \qquad (2)$$

Here, SOC in Expression (2) represents the power storage amount of the EV battery at time of day t. Also, EFF represents the charging/discharging efficiency of the EV battery. Also, the E_EV_CHARGE represents the charging power of the EV battery. Further, the E_EV_DISCHARGE represents the discharging power of the EV battery.

However, charging/discharging cannot coincide at time of day t; therefore, the following conditions are given.

[Expression 3]

$$E\_EV\_CHARGE(t) \cdot E\_EV\_DISCHARGE(t) = 0 \quad (3)$$

Above Expression (3) indicates that at least one of the charging power and the discharging power is zero. By using the conditions, the charging/discharging plan at time of day t ensures to perform either charging or discharging.

Next, the condition for securing the capacity (power storage amount) equal to or greater than the required power amount for the EV 105 to move between the facilities by the planned departure time for the EV 105 at each facility is represented by following Expression (4).

[Expression 4]

$$SOC(OUT\_TIME) \geq NECCESSAY\_SOC\_VALUE \quad (4)$$

Here, OUT_TIME in Expression (4) represents the planned departure time of EV 105. And, SOC(OUT_TIME) represents the power storage amount of the EV battery at the planned departure time. Also, NECCESSAY_SOC_VALUE represents the required charge amount required for the EV 105 to move between facilities.

Next, when representing that the charging/discharging plan is within the range of the maximum charge power and maximum discharge power of the charging/discharging unit of each planned connection facility when calculating the charging/discharging plan at each time of day, it is represented by following Expression (5).

[Expression 5]

$$\begin{cases} 0 \leq E\_EV\_CHARGE(t) \leq \\ E\_EV\_CHARGE\_MAX(i) \\ E\_EV\_CHARGE(t) = 0 \end{cases} \begin{array}{l} (IN\_TIME(i) \leq t \leq OUT\_TIME(i)) \\ \\ else \end{array} \quad (5)$$

$$\begin{cases} 0 \leq E\_EV\_DISCHARGE(t) \leq \\ E\_EV\_DISCHARGE\_MAX(i) \\ E\_EV\_DISCHARGE(t) = 0 \end{cases} \begin{array}{l} (IN\_TIME(i) \leq OUT\_TIME(i)) \\ \\ else \end{array}$$

Here, E_EV_CHARGE in Expression (5) represents the charge power of the storage battery at time of day t. Also, E_EV_DISCHARGE represents the discharge power of the storage battery at time of day t. Also, E_EV_CHARGE_MAX represents the maximum value of the charge power of the charging/discharging unit at the planned connection facility i. Also, E_EV_DISCHARGE_MAX represents the maximum value of the discharge power of the charging/discharging unit at the planned connection facility i. Also, IN_TIME represents the planned arrival time at the planned connection facility i. Also, OUT_TIME represents the planned departure time at the planned connection facility i.

The above are the constraints for creating a charging/discharging plan for each time of day of the EV battery. Next, an objective function for selecting, from the charging/discharging plans satisfying the above constraint conditions, a charging/discharging plan that minimizes the value obtained by subtracting the discharging profit generated by discharging from the charging cost generated by charging, which is calculated based on the buying power unit price and selling power unit price at each time of day of the planned connection facility, is represented by following Expression (6).

[Expression 6]

$$\min \sum_{i=0}^{F} \sum_{t=0}^{T} (C\_BUY(i, t) - C\_SELL(i, t)) \quad (6)$$

$$C\_BUY(i, t) = E\_EV\_CHARGE(t) \cdot E\_BUY\_COST(i, t)$$

$$C\_SELL(i, t) = E\_EV\_DISCHARGE(t) \cdot E\_SELL\_COST(i, t)$$

Here, C_BUY in Expression (6) represents the charging cost at time of day t. Also, C_SELL represents the discharging profit at time of day t. Also, E_BUY_COST represents the selling power unit price at time of day t. Also, E_SELL_COST represents the buying power unit price at time of day t.

Then, the charging/discharging plan with the value obtained by subtracting the discharging profit from the charging cost at each time of day being the smallest is created.

Figure 11:
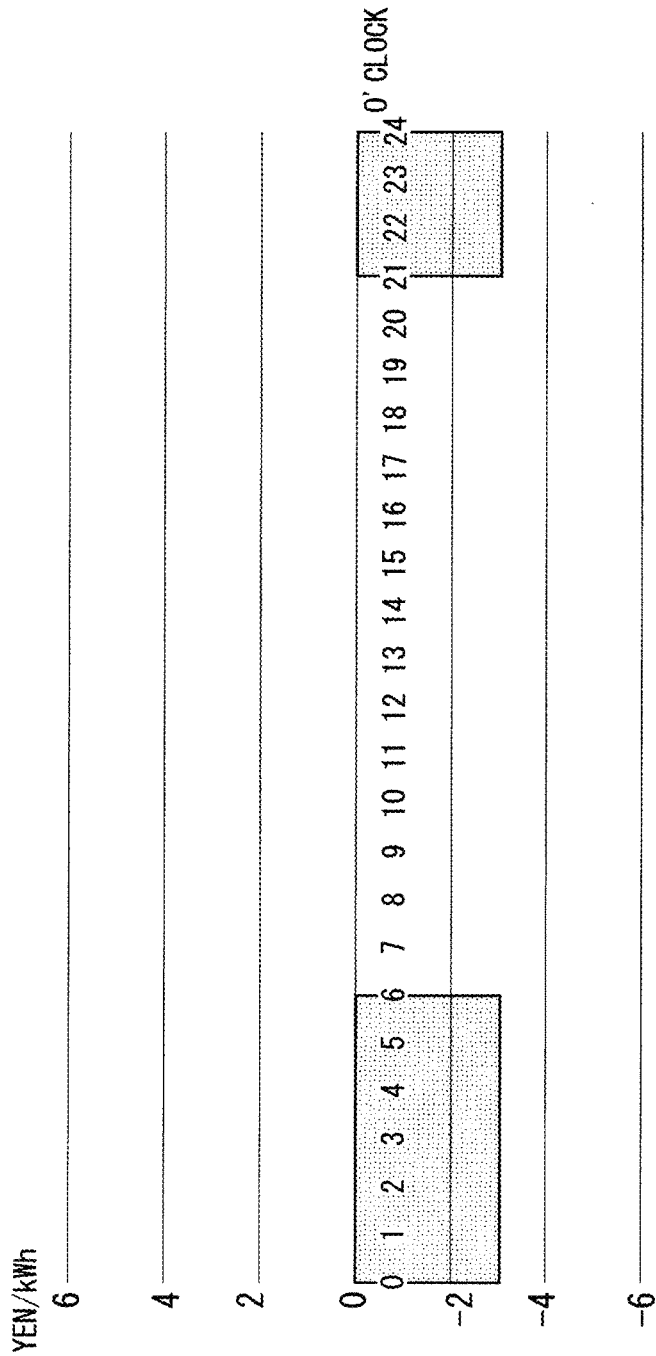
FIG. 11 A diagram illustrating an example of a charging/discharging amount of an EV battery in Facility 1.
Figure 12:
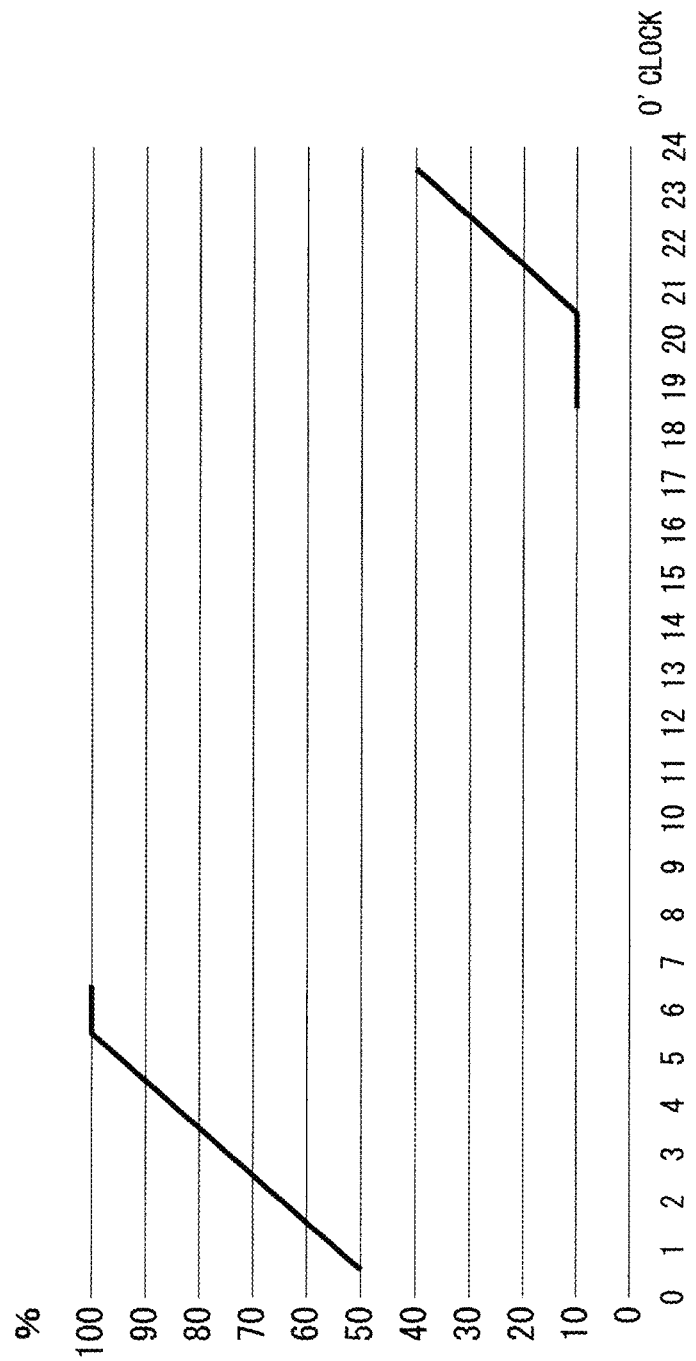
FIG. 12 A diagram illustrating an example of a power storage amount of the EV battery in Facility 1.

FIGS. 11 and 12 are diagrams illustrating an example of a charging/discharging plan for the EV battery in the facility 1 created by the charging/discharging plan creation unit 205.

FIG. 11 is a diagram illustrating an example of a charging/discharging amount of the EV battery in a facility 1. In FIG. 11, the vertical axis represents the charging/discharging amount [kWh], and the horizontal axis represents the time of day [o'clock]. Regarding the charging/discharging amount, a positive value indicates a discharging amount, and a negative value indicates a charging amount.

As an example illustrated in FIG. 11, in the facility 1, 3 [kWh] EV battery charging is performed in the time zone from 0:00 to 6:00 and the time zone from 21:00 to 24:00.

Also, FIG. 12 is a diagram illustrating an example of a power storage amount of the EV battery in the facility 1. In FIG. 12, the vertical axis represents the power storage rate [%], and the horizontal axis represents the time of day [o'clock].

As an example illustrated in FIG. 12, in the facility 1, the charging is performed in the time zone from 0:00 to 6:00 and the time zone from 21:00 to 24:00; therefore, the power storage rates rise in the respective time zones.

Figure 13:
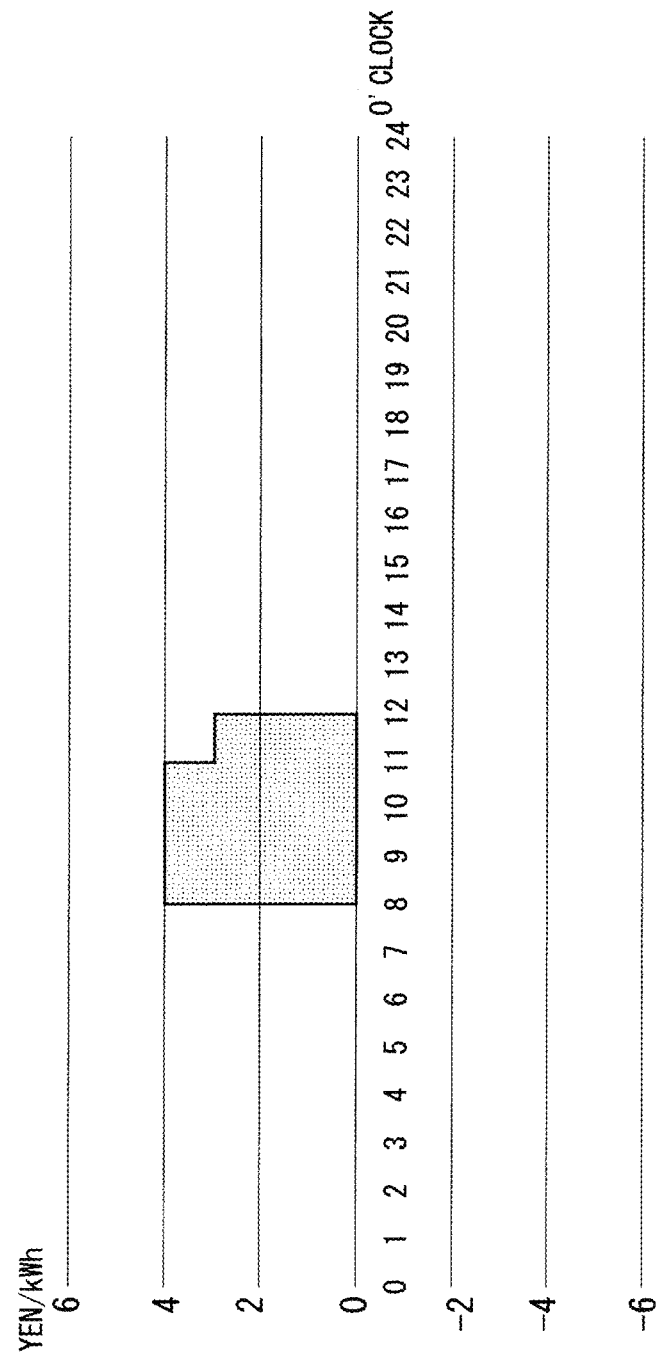
FIG. 13 A diagram illustrating an example of a charging/discharging amount of the EV battery in Facility 2.
Figure 14:
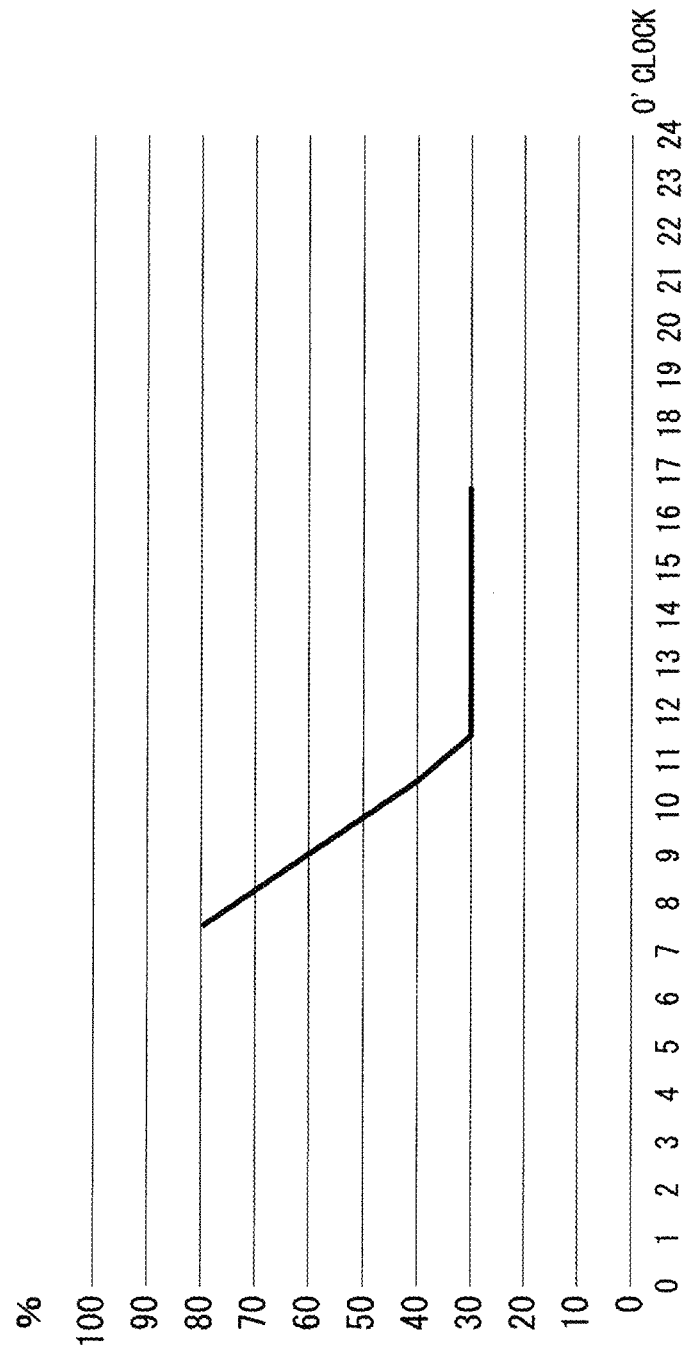
FIG. 14 A diagram illustrating an example of a power storage amount of the EV battery in Facility 2.

Similarly, FIGS. 13 and 14 are diagrams illustrating an example of a charging/discharging plan for the EV battery in the facility 2 created by the charging/discharging plan creation unit 205.

FIG. 13 is a diagram illustrating an example of a charging/discharging amount of the EV battery in the facility 2. In FIG. 13, the vertical axis represents the charging/discharging amount [kWh], and the horizontal axis represents the time of day [o'clock]. Regarding the charging/discharging amount, a positive value indicates a discharging amount, and a negative value indicates a charging amount.

As an example illustrated in FIG. 13, in the facility 2, 4 [kWh] EV battery discharging is performed in the time zone from 8:00 to 11:00. Also, in the facility 2, 3 [kWh] EV battery discharging is performed in the time zone from 11:00 to 12:00.

Also, FIG. 14 is a diagram illustrating an example of a power storage amount of the EV battery in the facility 2. In FIG. 14, the vertical axis represents the power storage rate [%], and the horizontal axis represents the time of day [o'clock].

As an example illustrated in FIG. 14, in the facility 2, the discharging is performed in the time zone from 8:00 to 12:00; therefore, the power storage rate declines in the time zone. However, the declining rate in the power storage rate also differs between the time zone from 8:00 to 11:00 and the time zone from 11:00 to 12:00 due to the difference in the discharging amount.

Next, the charging/discharging plan notification unit 206 will be described. The charging/discharging plan notification unit 206 notifies the EV user, the charging/discharging unit 104 of each facility, or a controller (such as a home energy management system (HEMS), a factory energy management system (FEMS), a building energy management system (BEMS)) that controls the charging/discharging units 104, of the charging/discharging plan for the EV battery in each facility created by the charging/discharging plan creation unit 205.

As a method of notifying the EV user, notifying a mobile terminal owned by the EV user, or notifying, instead of the EV user, a dedicated controllable application, such as a charging/discharging control device in each facility, capable of controlling charging/discharging the EV battery may be adopted.

Based on the usage schedule of the EV 105 and a difference between sell and purchase power prices among a plurality of facilities, the above energy management system 101 creates the charging/discharging plan with which the profit to be generated by a difference between a price of selling power when charging and a price of buying power when discharging due to discharging the power charged for a lower price by the EV user for a higher price, while securing the required power amount for the EV 105 to move among the plurality of facilities. By charging/discharging the EV battery based on such a charging/discharging plan, reduction in the total power cost related to the charging/discharging of the EV battery of the EV user is ensured.

In Embodiment 1, although an energy management system in which one EV 105 and two facilities are used has been described, a plurality of EVs 105 may be used and the number of facilities is not limited to the above.

Embodiment 2

An energy management system and an energy management method according to Embodiment 2 will be described. In the following description, components similar to the components described in above Embodiment will be illustrated with the same reference numerals, and detailed description thereof will be omitted as appropriate.

<Configuration of Energy Management System>

In Embodiment 1 described above, the usage schedule for the EV user is managed by setting the planned arrival time, the planned departure time, the planned arrival facility, and the required power amount using a dedicated application or the like. Further, it is desirable that the power storage amount of the EV battery at the time of arrival at the planned arrival facility is also set by the EV user.

However, it is difficult to accurately set the power storage amount of the EV battery and the required power amount when the EV user arrives at the planned arrival facility.

Therefore, in the energy management system according to Embodiment 2, the power storage amount of the EV battery and the required power amount at the time of arrival at the planned arrival facility are automatically calculated.

Figure 15:
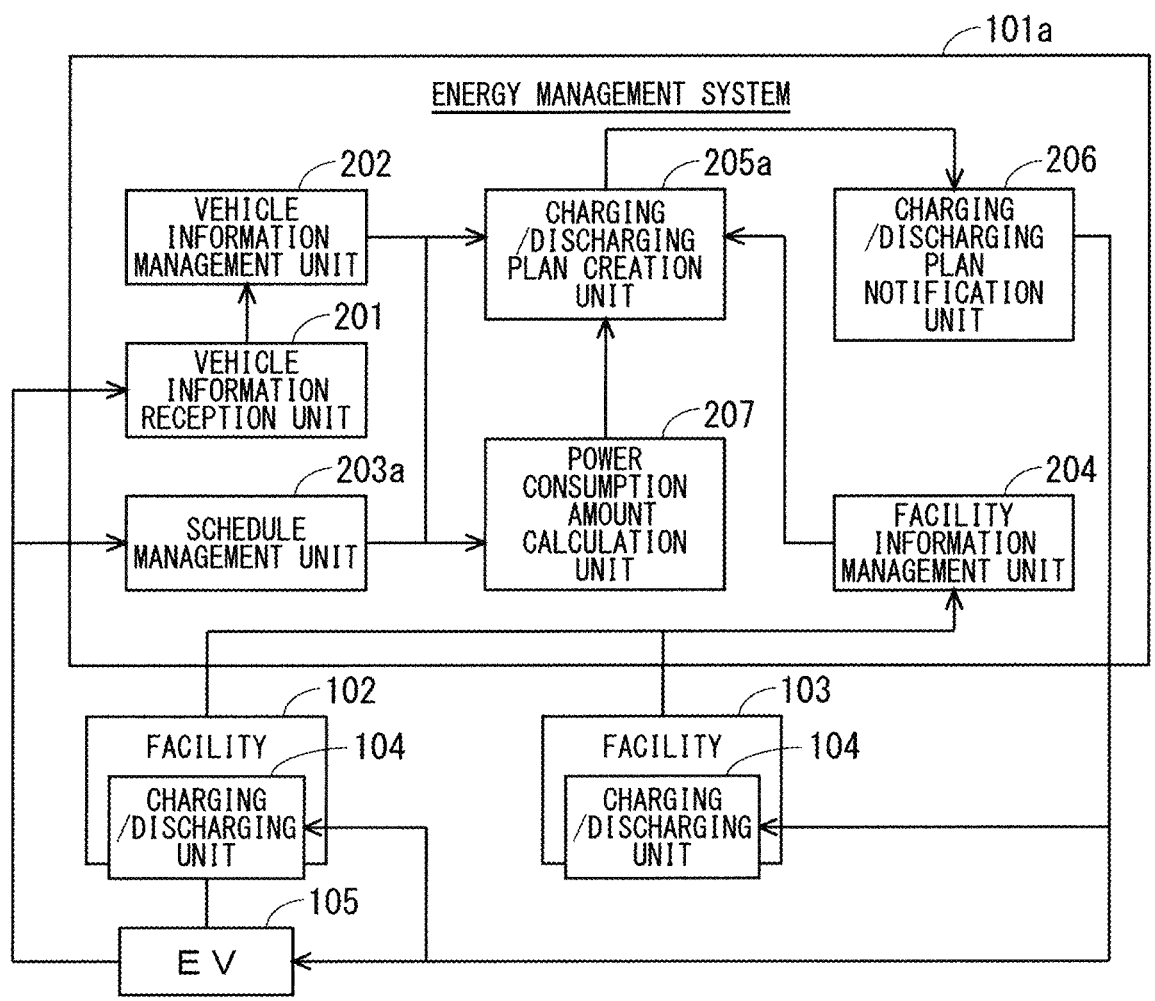
FIG. 15 A block diagram illustrating a more specific configuration of an energy management system according to Embodiment.

FIG. 15 is a block diagram illustrating a more specific configuration of the energy management system according to Embodiment 2.

As an example illustrated in FIG. 15, an energy management system 101a is in a state of being able to communicate with facilities 102 and 103.

The energy management system 101a includes a vehicle information reception unit 201, a vehicle information management unit 202, a schedule management unit 203a that manages a usage schedule, a facility information management unit 204, a charging/discharging plan creation unit 205a that creates a charging/discharging plan for the EV battery in each facility, the charging/discharging plan being for keeping the total power cost due to charging/discharging the EV battery low while securing the required power amount for the EV 105 to travel based on vehicle information, facility information, the usage schedule, and a power consumption amount being the power amount consumed by the EV 105 moving among the facilities, a charging/discharging plan notification unit 206, and a power consumption amount calculation unit 207.

First, the schedule management unit 203a will be described. In Embodiment 2, in the schedule management unit 203a, the EV user sets only the planned arrival time, the planned departure time, and the planned arrival facility.

FIG. 16 is a table illustrating an example of a usage schedule managed by the schedule management unit 203a. As an example illustrated in FIG. 16, in the schedule management unit 203a, the planned arrival date, the planned arrival time, the planned departure date, the planned departure time, and the planned arrival facility are managed.

In the example in FIG. 16, as one schedule, a case is managed in which the planned arrival date is "2018/9/6", the planned arrival time is "18:00", the planned departure date is "2018/9/7", the planned departure time is "07:00" and the planned arrival facility is a "facility 1" is managed.

Also in the example in FIG. 16, as an other schedule, a case is managed in which the planned arrival date is "2018/9/7", the planned arrival time is "08:00", the planned departure date is "2018/9/7", the planned departure time is "17:00", and the planned arrival facility is a "facility 2" is managed.

Next, the power consumption amount calculation unit 207 will be described. The power consumption amount calculation unit 207 calculates a power consumption amount based on the planned arrival time, the planned departure time, and the planned arrival facility managed by the schedule management unit 203a.

As a method of calculating a power consumption amount, for example, a method is adopted in which a power consumption amount is calculated based on a travel distance and a travel time of a travel route obtained by a map application, a satellite navigation system, or the like. Alternatively, the power consumption amount may be calculated based on information on the past traveling record of the EV 105.

FIG. 17 is a table illustrating an example of the power consumption amount calculated by the power consumption amount calculation unit 207. As an example illustrated in FIG. 17, the power consumption amount calculation unit 207 calculates a power consumption amount.

In FIG. 17, the power consumption amount being "6.00 kWh" when the origin is the "facility 1" and the destination is the "facility 2" is illustrated, as one example of the power consumption amount.

Also in FIG. 17, the power consumption amount being "6.00 kWh" when the origin is the "facility 2" and the destination is the "facility 1" is illustrated, as another example of the power consumption amount.

Then, based on the vehicle information managed by the vehicle information management unit 202, the usage schedule managed by the schedule management unit 203a, the power unit price information for each planned connection facility included in the facility information managed by the facility information management unit 204, and the power consumption amount calculated in the power consumption amount calculation unit 207, the charging/discharging plan creation unit 205a creates the charging/discharging plan for the EV batter in each facility, with which that the total power cost taken for charging/discharging the EV battery is made minimum while securing the required power amount (that is, required power amount on departure) for the EV 105 to travel, within a range of the chargeable/dischargeable capacity of the EV battery.

The energy management system 101a as described above ensures the reduction in the burden for the EV user entailed in the setting of the usage schedule. Therefore, the convenience for the EV user can be improved.

Embodiment 3

An energy management system and an energy management method according to Embodiment 3 will be described. In the following description, components similar to the components described in above Embodiments will be illustrated with the same reference numerals, and detailed description thereof will be omitted as appropriate.

<Configuration of Energy Management System>

In above Embodiments, the buying power unit price and the selling power unit price at each facility are determined from the purchasing power unit price based on the contract with the electric power retailer. However, depending on the facility, adjustment of the buying power unit price and the selling power unit price at each time of day is required in some cases, based on the contracted power (the maximum value of purchasing power), power consumption of a facility (power load) or a power generation amount by renewable energy equipment such as solar power generation equipment.

Therefore, in the energy management system according to Embodiment 3, the buying power unit price and the selling power unit price at each time of day are determined based on the power demand in a facility which is based on power consumption of a facility, a power generation amount by renewable energy equipment, or the like.

FIG. 18 is a block diagram illustrating a more specific configuration of the energy management system according to Embodiment 3.

As an example illustrated in FIG. 18, an energy management system 101b is in a state of being able to communicate with facilities 102 and 103.

The energy management system 101b includes a vehicle information reception unit 201, a vehicle information management unit 202, a schedule management unit 203a, a facility information management unit 204b that manages facility information, a charging/discharging plan creation unit 205b that creates a charging/discharging plan for the EV battery in each facility, the charging/discharging plan being for keeping the total power cost due to charging/discharging the EV battery low while securing the required power amount for the EV 105 to travel based on vehicle information, the facility information, the usage schedule, the power consumption amount, and the power unit price information, a charging/discharging plan notification unit 206, a power consumption amount calculation unit 207, a measurement value management unit 208, a facility power estimation unit 209, and a power unit price determination unit 210.

First, the facility information management unit 204b will be described. The facility information management unit 204b according to Embodiment 3 manages the purchasing power unit price and the contracted power (the maximum value of purchasing power) at each time of day.

Next, the measurement value management unit 208 will be described. The measurement value management unit 208 manages the power consumption of the load equipment of a facility or the power generation amount of the renewable energy equipment measured at each facility.

Next, the facility power estimation unit 209 will be described. Based on the power consumption of the load equipment of the facility and the power generation amount of the renewable energy equipment managed by the measurement value management unit 208, the facility power estimation unit 209 calculates an estimation value of the power consumption and the estimation value of the power generation amount of the renewable energy equipment at each time of day of the entire facility. As a method for estimating power consumption or a method for estimating the power generation amount, a method using a known technique utilizing meteorological information or the like is adopted.

Next, the power unit price determination unit 210 will be described. Based on the purchasing power unit price and the contracted power managed by the facility information management unit 204b and the estimation value of the power consumption and the estimation value of the power generation amount calculated by the facility power estimation unit 209, the power unit price determination unit 210 determines an incentive of the buying power unit price and the selling power unit price, or discharging.

Figure 19:
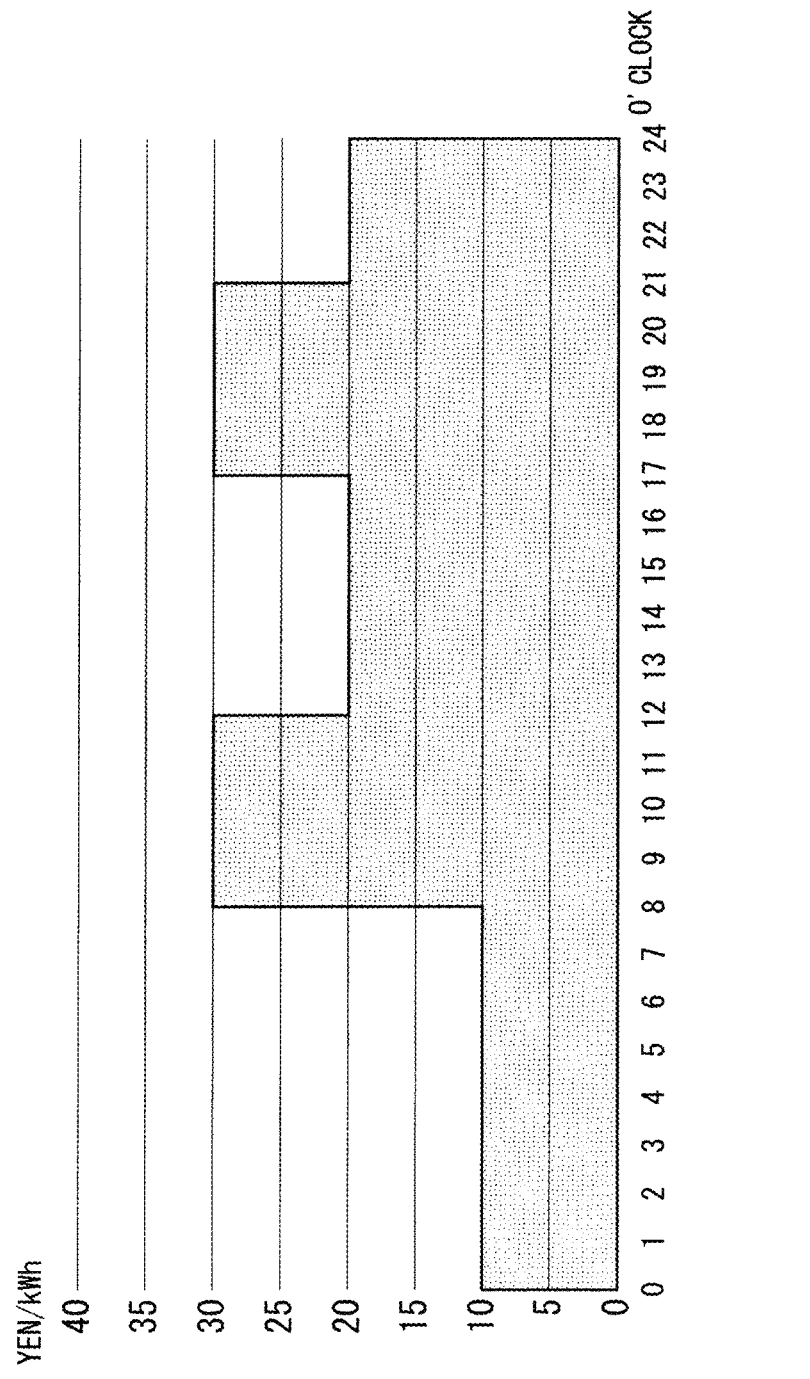
FIG. 19 A diagram illustrating an example of a purchasing power unit price at each time of day of a facility.

Here, a method of determining the buying power unit price and the selling power unit price will be described with an example. FIG. 19 is a diagram illustrating an example of a purchasing power unit price at each time of day of a facility. In FIG. 19, the vertical axis represents the power unit price [yen/kWh], and the horizontal axis represents the time of day [o'clock].

As an example illustrated in FIG. 19, at the facility, the purchasing power unit price is 10 [yen/kWh] in the time zone from 0:00 to 8:00. Also at the facility, the purchasing power unit price is 30 [yen/kWh] in the time zone from 8:00 to 12:00.

Also at the facility, the purchasing power unit price is 20 [yen/kWh] in the time zone from 12:00 to 17:00. Also at the facility, the purchasing power unit price is 30 [yen/kWh] in the time zone from 17:00 to 21:00.

Also at the facility, the purchasing power unit price is 20 [yen/kWh] in the time zone from 21:00 to 24:00.

Figure 20:
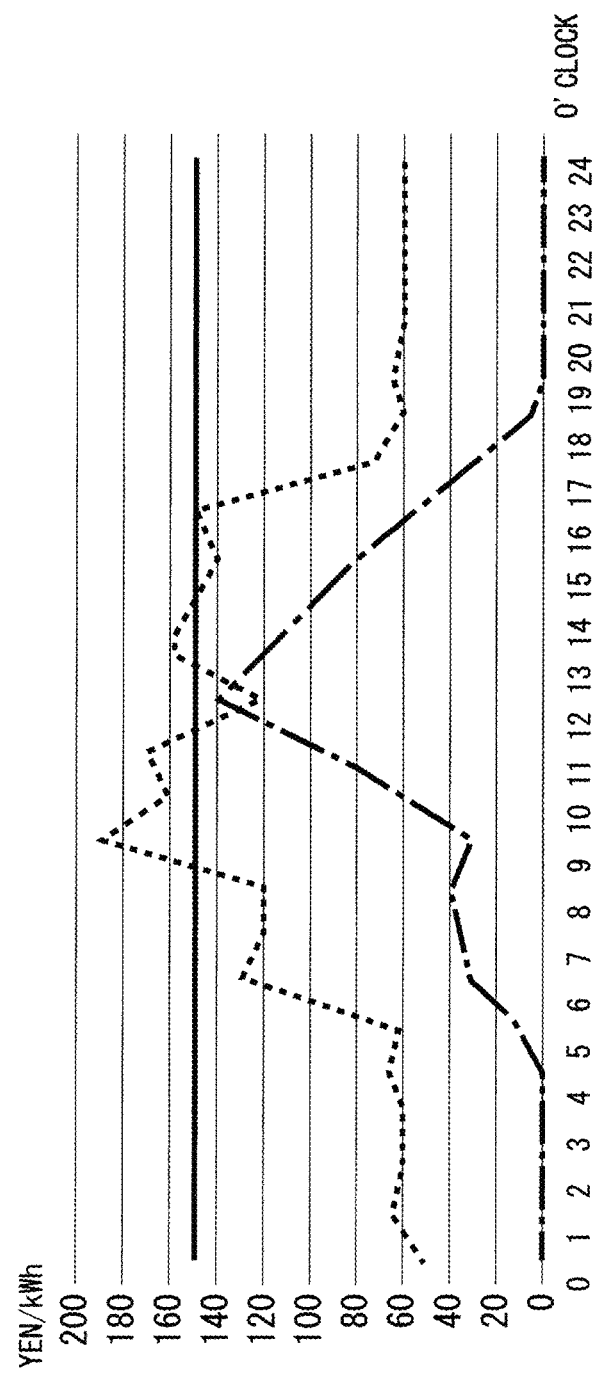
FIG. 20 A graph illustrating an example of estimation values of power consumption, estimation values of power generation amount, contracted power of a facility at each time of day.

FIG. 20 is a graph illustrating an example of estimation values of power consumption, estimation values of the power generation amount, and the contracted power of a facility at each time of day. In FIG. 20, the vertical axis represents the power unit price [yen/kWh], and the horizontal axis represents the time of day [o'clock]. Also, in FIG. 20, the estimation values of power consumption are illustrated by a dotted line, the estimation values of the power generation amount are illustrated by a one dot chain line, and the contracted power is illustrated by a solid line.

As an example illustrated in FIG. 20, at the facility, the estimation value of power consumption is high while the estimation value of the power generation amount is low in the time zone from 9:00 to 10:00. Therefore, the power consumption in the time zone may possibly exceed the contracted power of the facility.

Therefore, in order to obtain a large amount of discharge from the EV 105 connected in the time zone, the power purchase price in the time zone is set higher than that in other time zones.

On the other hand, at the facility, the estimation value of the power generation amount may possibly exceed the estimation value of power consumption in the time zone from 12:00 to 13:00.

Therefore, in order to charge the EV 105 to be connected with the surplus power in the time zone, the price of selling power in the time zone is set lower than in the other time zones.

In this manner, the power unit price determination unit 210 determines the buying power unit price and the selling power unit price of the facility in accordance with the estimation value of power consumption and the estimation value of the power generation amount.

Figure 21:
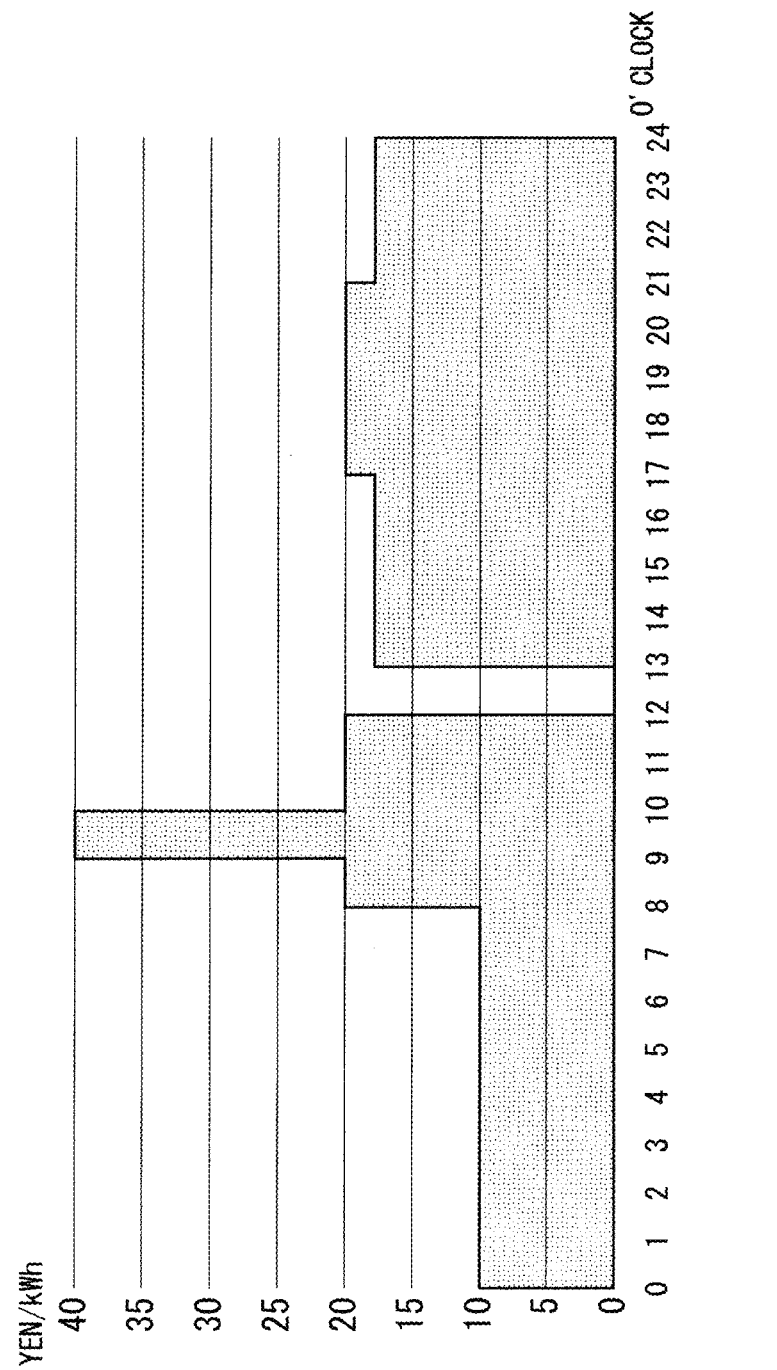
FIG. 21 A diagram illustrating an example of the buying power unit price determined by a power unit price determination unit.

FIG. 21 is a diagram illustrating an example of the buying power unit price determined by a power unit price determination unit 210.

As an example illustrated in FIG. 21, at the facility, the buying power unit price is 10 [yen/kWh] in the time zone from 0:00 to 8:00. Also at the facility, the buying power unit price is 20 [yen/kWh] in the time zone of 8:00.

Also at the facility, the buying power unit price is 40 [yen/kWh] in the time zone from 9:00 to 10:00. Also at the facility, the buying power unit price is 20 [yen/kWh] in the time zone from 10:00 to 12:00.

Also at the facility, the buying power unit price is 0 [yen/kWh] in the time zone from 12:00 to 13:00 (that is, free of charge). Also at the facility, the buying power unit price is 18 [yen/kWh] in the time zone from 13:00 to 17:00.

Also at the facility, the buying power unit price is 20 [yen/kWh] in the time zone from 17:00 to 21:00. Also at the facility, the buying power unit price is 18 [yen/kWh] in the time zone from 21:00 to 24:00.

Figure 22:
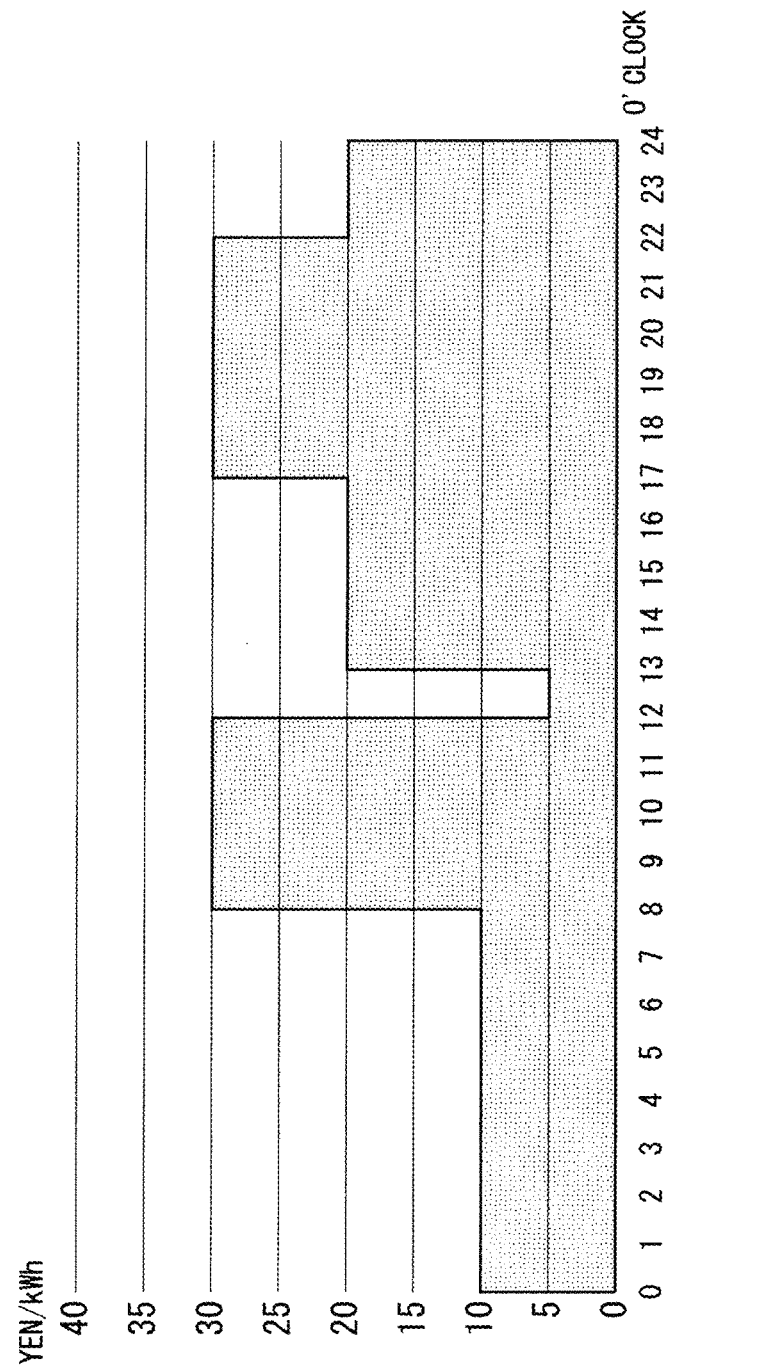
FIG. 22 A diagram illustrating an example of the selling power unit price determined by the power unit price determination unit.

FIG. 22 is a diagram illustrating an example of the selling power unit price determined by the power unit price determination unit 210.

As an example illustrated in FIG. 22, at the facility, the selling power unit price is 10 [yen/kWh] in the time zone from 0:00 to 8:00. Also at the facility, the selling power unit price is 30 [yen/kWh] in the time zone from 8:00 to 12:00.

Also at the facility, the selling power unit price is 5 [yen/kWh] in the time zone from 12:00 to 13:00. Also at the facility, the selling power unit price is 20 [yen/kWh] in the time zone from 13:00 to 17:00.

Also at the facility, the selling power unit price is 30 [yen/kWh] in the time zone from 17:00 to 22:00. Also at the facility, the selling power unit price is 20 [yen/kWh] in the time zone from 22:00 to 24:00.

Then, based on the vehicle information managed by the vehicle information management unit 202, the usage schedule managed by the schedule management unit 203*a*, the power unit price information determined by the power unit price determination unit 210, and the power consumption amount calculated in the power consumption amount calculation unit 207, the charging/discharging plan creation unit 205*b* creates the charging/discharging plan for the EV battery in each facility, with which the total power cost taken for charging/discharging the EV battery is made minimum while securing the required power amount (that is, required power amount on departure) for the EV 105 to travel, within a range of the chargeable/dischargeable capacity of the EV battery.

The energy management system 101*b* as described above determines the buying power unit price and the selling power unit price in accordance with the power demand of the facility based on the power consumption of the facility, the power generation amount of renewable energy or the like.

Embodiment 4

An energy management system and an energy management method according to Embodiment 4 will be described. In the following description, components similar to the components described in above Embodiments will be illustrated with the same reference numerals, and detailed description thereof will be omitted as appropriate.

<Configuration of Energy Management System>

In above Embodiments, the charging/discharging plan with which the total power cost of the charging/discharging of the EV battery is reduced is created based on the buying power unit price and the selling power unit price at each time of day of the planned connection facility within the usage schedule of the EV user.

However, depending on the EV user, the total power cost due to the charging/discharging of the EV battery is further reduced by charging/discharging the EV battery outside the range of the usage schedule.

Therefore, in the energy management system according to Embodiment 4, a usage schedule and a charging/discharging plan with which the total power cost due to the charging/discharging of the EV battery are calculated with the times of day outside the range of the usage schedule of the EV 105 set by the EV user being taken into consideration, and the usage schedule and the charging/discharging plan are presented to the EV user.

Figure 23:
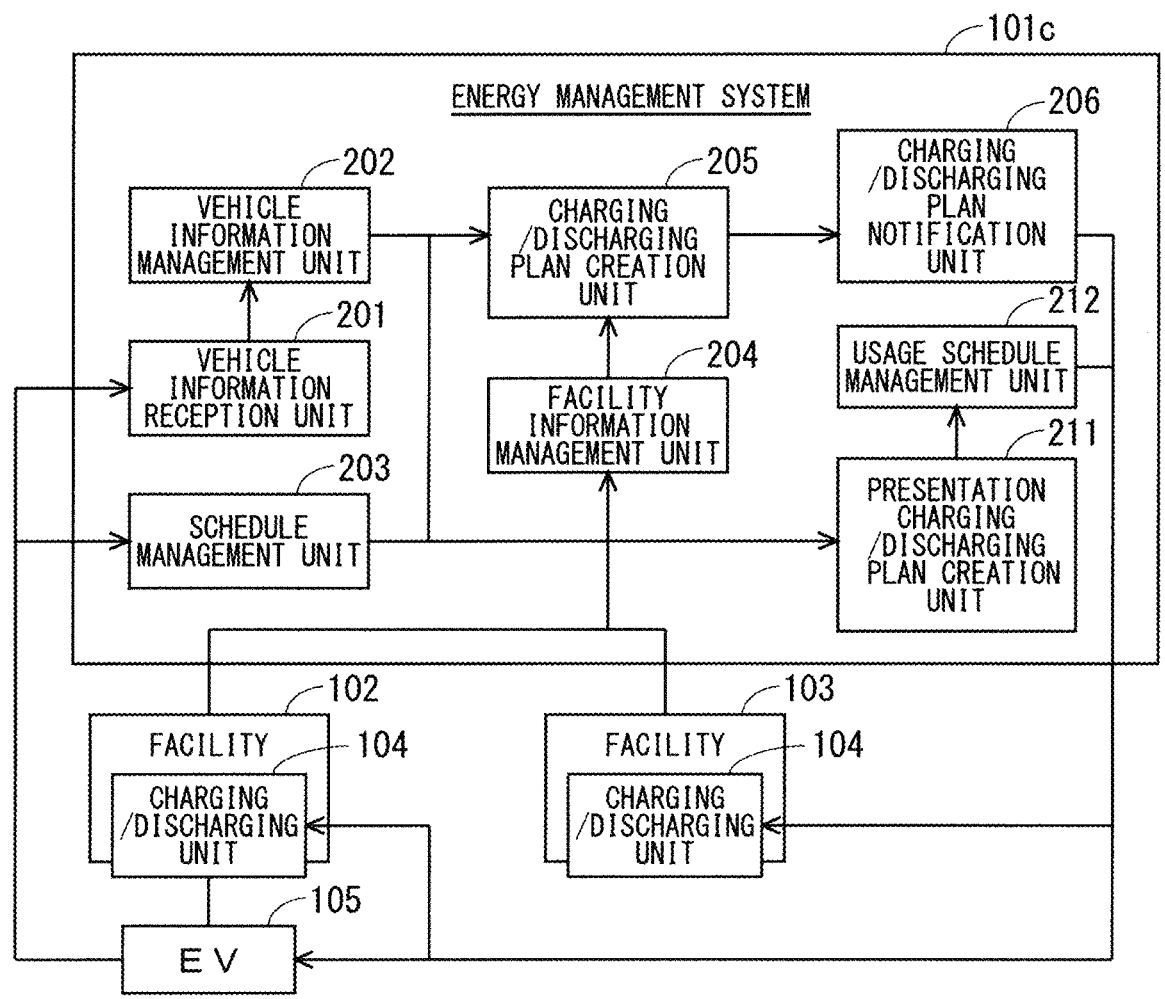
FIG. 23 A block diagram illustrating a more specific configuration of an energy management system according to Embodiment.

FIG. 23 is a block diagram illustrating a more specific configuration of the energy management system according to Embodiment 4.

As an example illustrated in FIG. 23, an energy management system 101*c* is in a state of being able to communicate with facilities 102 and 103.

The energy management system 101*c* includes a vehicle information reception unit 201, a vehicle information management unit 202, a schedule management unit 203, a facility information management unit 204 that manages facility information, a charging/discharging plan creation unit 205, a charging/discharging plan notification unit 206, a presentation charging/discharging plan creation unit 211, and a usage schedule presentation unit 212.

First, the presentation charging/discharging plan creation unit 211 will be described. Based on the usage schedule (including a planned arrival time, a planned departure time, a planned arrival facility, or a required power amount and the like) set by the EV user, the presentation charging/discharging plan creation unit 211 changes the planned departure time or the planned arrival time to the extent possible while taking the time taking to move between the facilities into consideration. Then, the presentation charging/discharging plan creation unit 211 creates a charging/discharging plan at each time of day at each planned connection facility in that case.

Here, based on at least one of the changed planned arrival time and the planned departure time, the presentation charging/discharging plan creation unit 211 creates a charging/discharging plan with which a value obtained by subtracting the total discharging profit generated by the discharge of the storage battery at the facility 102 and the facility 103 from the total charging cost generated by the charge of the storage battery at the facility 102 and the facility 103 is minimized.

Then, the presentation charging/discharging plan creation unit 211 calculates the total power cost due to charging/discharging in that case, and determines whether the calculated power cost is lower than the total power cost due to charging/discharging based on the charging/discharging plan created by the charging/discharging plan creation unit 205.

Then, when the total power cost of the charging/discharging plan created by the presentation charging/discharging plan creation unit 211 is lower, the presentation charging/discharging plan creation unit 211 temporarily stores the charging/discharging plan and the corresponding total power cost.

Then, the presentation charging/discharging plan creation unit 211 changes the planned departure time or the planned arrival time again, and repeats the process of creating the charging/discharging plan. In terms of the number of times the charging/discharging plan is created repeatedly, all changeable cases are changed within a plan creating period, and then the charging/discharging plan corresponding to each change may be created, and the corresponding total power cost may be calculated, or after limiting the time range during which the changing is allowed to be performed (for example, within 2 hours), and then the planned departure time or the planned arrival time may be changed within the range to create the charging/discharging plan, and the corresponding total power cost may be calculated.

Figure 24:
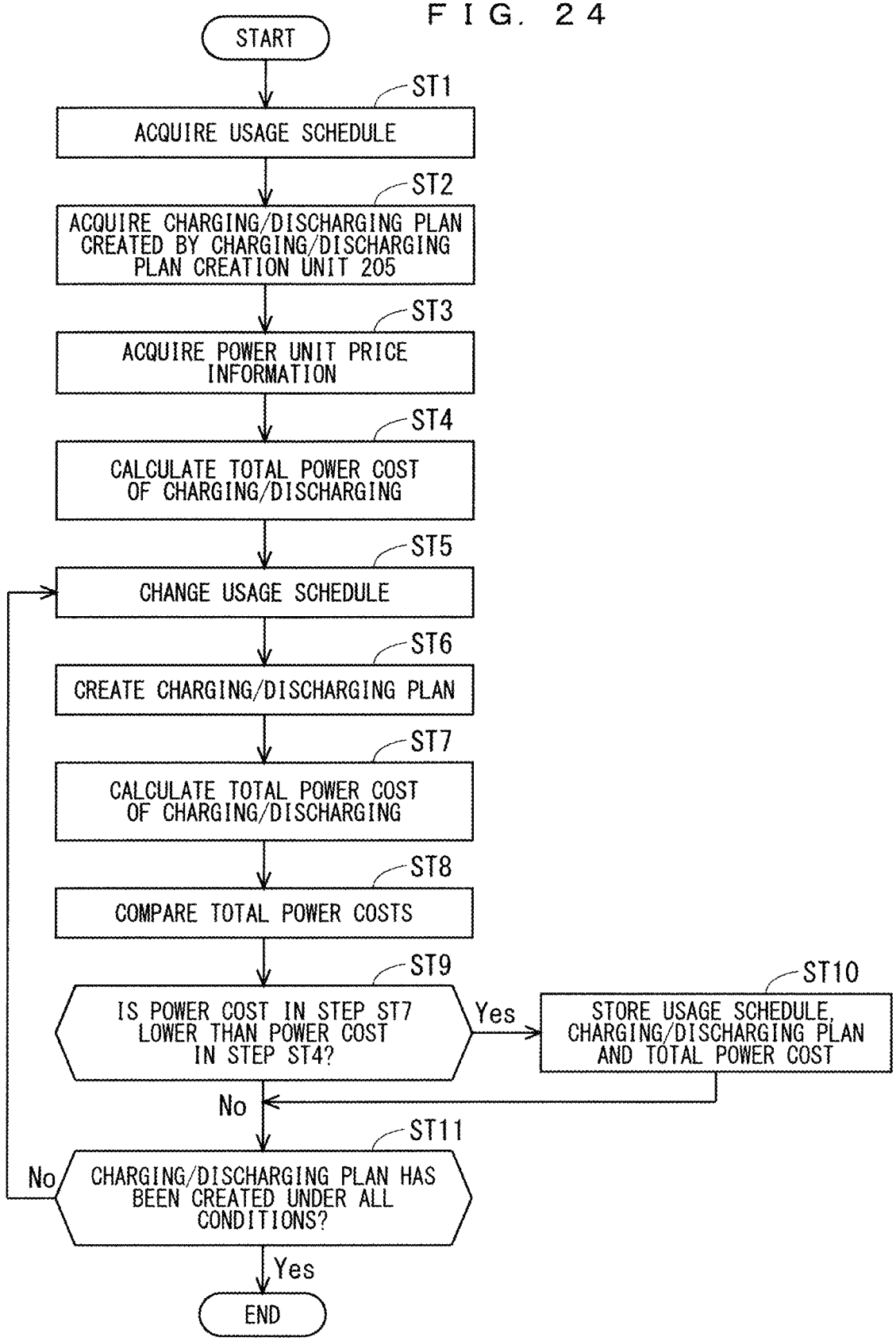
FIG. 24 A flowchart illustrating an example of a processing flow of a presentation charging/discharging plan creation unit.

FIG. 24 is a flowchart illustrating an example of a processing flow of the presentation charging/discharging plan creation unit 211.

First, the presentation charging/discharging plan creation unit 211 acquires the usage schedule (for example, the usage schedule as illustrated in FIG. 16) set by the EV user (Step ST1 in FIG. 24).

Next, the presentation charging/discharging plan creation unit 211 acquires the charging/discharging plan (for example, the charging/discharging plan as illustrated in FIG. 11 or 13) created by the charging/discharging plan creation unit 205 (Step ST2 in FIG. 24). In Embodiment 4, although the charging/discharging plan creation unit 205 is provided, for example, the presentation charging/discharging plan creation unit 211 may acquire the charging/discharging plan created by the charging/discharging plan creation unit 205a or the charging/discharging plan creation unit 205b with the methods illustrated in corresponding Embodiments, respectively.

Next, the presentation charging/discharging plan creation unit 211 acquires the power unit price information (for example, the buying power unit price and the selling power unit price as illustrated in FIGS. 6, 7, 9 and 10.) at each time of day of each facility (Step ST3 in FIG. 24).

Next, the presentation charging/discharging plan creation unit 211 calculates the total power cost, due to charging/discharging, of the charging/discharging plan created by the charging/discharging plan creation unit 205 based on the information acquired in Steps ST2 and ST3 (Step ST4 in FIG. 24). For example, Expression (6) is used to calculate the total power cost.

Next, the presentation charging/discharging plan creation unit 211 changes the usage schedule of the EV 105 acquired in Step ST1 (Step ST5 in FIG. 24).

FIGS. 25, 26, and 27 are tables illustrating an example of the change of usage schedule by the presentation charging/discharging plan creation unit 211. In FIGS. 25, 26 and 27, the state in which the EV 105 is connected to a facility is shown in black.

The example illustrated in FIG. 25 is the usage schedule before the change when the charging/discharging plan is created at 17:00. On the other hand, the example illustrated in FIG. 26 is the usage schedule when the planned arrival time at the facility 1 of the usage schedule illustrated in FIG. 25 is changed from 18:00 to 19:00.

The example illustrated in FIG. 27 is a usage schedule in which the planned departure time at facility 1 of the usage schedule illustrated in FIG. 25 is changed from 7:00 to 6:00, and the planned arrival time at facility 2 of the usage schedule illustrated in FIG. 25 is changed from 8:00 to 7:00.

As the example illustrated in FIG. 27, in changing the usage schedule, the change of the planned departure time requires to take time taking to move between the facilities into consideration; therefore, the next planned arrival time is also changed accordingly. Similarly, it is assumed that when the planned arrival time is changed, the planned departure time before that is also changed in consideration of the time taking to move between the facilities.

Next, the presentation charging/discharging plan creation unit 211 creates a charging/discharging plan using the usage schedule changed in Step ST5 (Step ST6 in FIG. 24). The charging/discharging plan is created by the same method as in the charging/discharging plan creation unit 205.

Next, based on the charging/discharging plan created in Step ST6 and the power unit price information at each time of day of each facility acquired in Step ST2 (the buying power unit price and the selling power unit price), the presentation charging/discharging plan creation unit 211 calculates the total power cost due to charging/discharging the EV battery (Step ST7 in FIG. 24).

Next, the presentation charging/discharging plan creation unit 211 compares the total power cost calculated in Step ST4 with the total power cost calculated in Step ST7 (Step ST8 in FIG. 24).

Then, the presentation charging/discharging plan creation unit 211 determines whether the total power cost calculated in Step ST7 is lower than the total power cost calculated in Step ST4 (Step ST9 in FIG. 24).

When the total power cost calculated in Step ST7 is lower than the total power cost calculated in Step ST4, that is, when the case corresponds to "YES" branching from Step ST9 illustrated as an example in FIG. 24, the process proceeds to Step ST10 illustrated as an example in FIG. 24.

Meanwhile, when the total power cost calculated in Step ST7 is higher than the total power cost calculated in Step ST4, that is, when the case corresponds to "NO" branching from Step ST9 illustrated as an example in FIG. 24, the process proceeds to Step ST11 illustrated as an example in FIG. 24.

In Step ST10, the usage schedule after the change in Step ST5, the charging/discharging plan created in Step ST6, and the total power cost calculated in Step ST7 are stored. Then, the process proceeds to step ST11.

In Step ST11, whether or not the charging/discharging plan has been created under all conditions is determined. The operation ends when a charging/discharging plan is created under all conditions, that is, when the case corresponds to "YES" branching from Step ST11 illustrated as an example in FIG. 24. Meanwhile, the process returns to Step ST5 illustrated as an example in FIG. 24 when a charging/discharging plan is not created under all conditions, that is, when the case corresponds to "NO" branching from Step ST11 illustrated as an example in FIG. 24.

In terms of conditions to end the operation, whether or not the change under all conditions (cases) has been completed may be determined, or the time range during which the changing is allowed to be performed (for example, within 2 hours) is fixed in advance, and then the operation may end when the change under all cases is completed within the range.

FIGS. 28, 29, 30, 31 and 32 are tables illustrating an example of the change of usage schedule by the presentation charging/discharging plan creation unit 211. The example illustrated in FIGS. 28, 29, 30, 31 and 32 are the example in which a range that allows changing of the usage schedule is 2 hours. In FIGS. 28, 29, 30, 31 and 32, the state in which the EV 105 is connected to a facility is shown in black.

The example illustrated in FIG. 28 is the usage schedule when the planned arrival time at the facility 1 of the usage schedule illustrated in FIG. 25 is changed from 18:00 to 17:00.

The example illustrated in FIG. 29 is a usage schedule in which the planned departure time at facility 1 of the usage schedule illustrated in FIG. 25 is changed from 7:00 to 8:00, and the planned arrival time at facility 2 of the usage schedule illustrated in FIG. 25 is changed from 8:00 to 9:00.

The example illustrated in FIG. 30 is a usage schedule in which the planned departure time at facility 1 of the usage schedule illustrated in FIG. 25 is changed from 7:00 to 9:00, and the planned arrival time at facility 2 of the usage schedule illustrated in FIG. 25 is changed from 8:00 to 10:00.

The example illustrated in FIG. 31 is a usage schedule in which the planned arrival time at facility 1 of the usage schedule illustrated in FIG. 25 is changed from 18:00 to 17:00, the planned departure time at facility 1 of the usage schedule illustrated in FIG. 25 is changed from 7:00 to 8:00, and the planned arrival time at facility 2 of the usage schedule illustrated in FIG. 25 is changed from 8:00 to 9:00.

The example illustrated in FIG. 32 is a usage schedule in which the planned arrival time at facility 1 of the usage schedule illustrated in FIG. 25 is changed from 18:00 to 17:00, the planned departure time at facility 1 of the usage schedule illustrated in FIG. 25 is changed from 7:00 to 9:00, and the planned arrival time at facility 2 of the usage schedule illustrated in FIG. 25 is changed from 8:00 to 10:00.

Next, the usage schedule presentation unit 212 will be described. The usage schedule presentation unit 212 notifies the EV user of the changed planned departure time, the changed planned arrival time, the changed total power cost, and the total power cost based on the usage schedule set by the EV user, which are stored as a changed usage schedule in the presentation charging/discharging plan creation unit 211.

As a notification method to the EV user, for example, there is a method of notifying a mobile terminal owned by the EV user. In terms of the usage schedule to be notified, only the least total power cost among the usage schedules stored in the presentation charging/discharging plan creation unit 211 may be presented, all usage schedules stored in the presentation charging/discharging plan creation unit 211 may be presented, or only the top few of the usage schedules stored in the presentation charging/discharging plan creation unit 211 may be presented in ascending order of total power cost.

FIG. 33 is a table illustrating an example of a usage schedule presented to an EV user. As an example illustrated in FIG. 33, the usage schedule to be presented includes a name of EV, a planned arrival date, a planned arrival time, a planned departure date, a planned departure time, a planned arrival facility, a total power cost according to usage schedule set by EV user, a total power cost according to changed usage schedule, and a difference before and after change.

In an example of FIG. 33, a schedule in which the planned arrival date is "2018/9/6", the planned arrival time is "19:00", the planned departure date is "2018/9/7", the planned departure time is "07:00", and the planned arrival facility is the "facility 1", and a schedule in which the planned arrival date is "2018/9/7", the planned arrival time is "08:00", the planned departure date is "2018/9/7", the planned departure time is "18:00", and the planned arrival facility is the "facility 2" are illustrated as a changed schedule for the vehicle 1 and the total power cost according to the pre-change usage schedule being "300 yen", the total power cost according to the post-change usage schedule being "250 yen", and the difference before and after the change of usage schedule being "50 yen" are illustrated.

Then, when the EV user who has been presented with the usage schedule changes the schedule such that the presented usage schedule and the charging/discharging plan are implemented, the EV user changes the schedule using an above dedicated application or the like which is used when setting the usage schedule.

With the above energy management system 101c, a usage schedule with which the total power cost is reduced more than the total power cost based on the usage schedule set by the EV user is presented; therefore, the convenience of EV user is improved.

<Hardware Configuration of Energy Management System>

Figure 34:
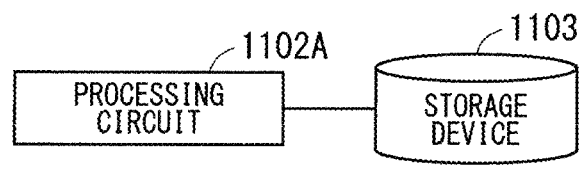
FIG. 34 A diagram schematically illustrating a hardware configuration when the energy management system illustrated in FIG. 36 is practically operated.
Figure 35:
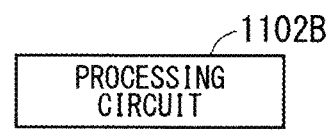
FIG. 35 A diagram schematically illustrating a hardware configuration when the energy management system illustrated in FIG. 36 is practically operated.

FIGS. 34 and 35 are diagrams schematically illustrating hardware configurations when the energy management system illustrated in FIG. 36 is practically operated.

Although, the hardware configurations illustrated in FIGS. 34 and 35 may not be consistent with the configurations illustrated in FIG. 36, this is because the configuration illustrated in FIG. 36 represents a conceptual unit.

Therefore, at least one of a case where one configuration illustrated in FIG. 36 consists of a plurality of hardware configurations illustrated in FIGS. 34 and 35, a case where one configuration illustrated in FIG. 36 corresponds to a portion of the hardware configurations illustrated in FIGS. 34 and 35, and a case where a plurality of configurations illustrated in FIG. 36 are provided in one hardware configuration illustrated in FIGS. 34 and 35 are assumed.

Further, the hardware configurations illustrated in FIGS. 34 and 35 embody and illustrate the conceptual configurations of the energy management system illustrated in FIG. 36. Therefore, in FIGS. 34 and 35, in addition to the hardware configuration corresponding to the conceptual configuration of the energy management system, a new hardware configuration may be added, however, the energy management system according to Embodiment 4 can be established even when the newly added hardware configuration is not provided.

In FIG. 34, the charging/discharging plan creation unit 1002 in FIG. 36, the charging/discharging plan creation unit 205 in FIG. 1, the charging/discharging plan creation unit 205a in FIG. 15 and the power consumption amount calculation unit 207, the charging/discharging plan creation unit 205b in FIG. 18, the facility power estimation unit 209 and the power unit price determination unit 210, as a hardware configuration for realizing the presentation charging/discharging plan creation unit 211 and the usage schedule presentation unit 212 in FIG. 23, a processing circuit 1102A that performs calculation, and a storage device 1003 that stores information are illustrated. These configurations are the same in other Embodiments.

In FIG. 35, the charging/discharging plan creation unit 1002 in FIG. 36, the charging/discharging plan creation unit 205 in FIG. 1, the charging/discharging plan creation unit 205*a* in FIG. 15 and the power consumption amount calculation unit 207, the charging/discharging plan creation unit 205*b* in FIG. 18, the facility power estimation unit 209 and the power unit price determination unit 210, and as a hardware configuration for realizing the presentation charging/discharging plan creation unit 211 and the usage schedule presentation unit 212 in FIG. 23, a processing circuit 1102B that performs calculation are illustrated. The configurations are the same in other Embodiments.

The vehicle information management unit 202 in FIG. 1, the schedule management unit 203, the facility information management unit 204, and the measurement value management unit 208 in FIG. 18 are realized by the storage device 1103 or another storage device (not shown here).

The storage device 1103 may be, for example, a non-volatile or volatile semiconductor memory, such as a hard disk drive (that is, HDD), a random access memory (that is, RAM), a read only memory (that is, ROM), a flash memory, an erasable programmable read only memory (EPROM), or an electrically erasable programmable read-only memory (EEPROM), a memory (storage medium) including a magnetic disk, a flexible disk, an optical disk, a compact disk, a mini disk, and a DVD, or any storage medium used in the future.

The processing circuit 1102A may execute a program stored in the storage device 1103, an external CD-ROM, an external DVD-ROM, an external flash memory, or the like. That is, the processing circuit 1102A may be, for example, a central processing unit (that is, CPU), a microprocessor, a microcomputer, or a digital signal processor (that is, DSP).

When the processing circuit 1102A executes a program stored in the storage device 1103, an external CD-ROM, an external DVD-ROM, an external flash memory, or the like, the above corresponding processing is realized by software, firmware or a combination of software and firmware in which the program stored in the storage device 1103 is executed by the processing circuit 1102A. The corresponding processing described above may be realized, for example, by coordinating a plurality of processing circuits.

The software and firmware may be written as a program and stored in the storage device 1103. In that case, the processing circuit 1102A realizes the above functions by reading and executing the program stored in the storage device 1103. That is, the storage device 1103 may store a program in which the above functions are eventually realized by being executed by the processing circuit 1102A.

Further, the processing circuit 1102B may be dedicated hardware. That is, for example, a single circuit, a composite circuit, a programmed processor, a parallel programmed processor, an Application Specific Integrated Circuit (that is, ASIC), or a Field-Programmable Gate Array (FPGA), or the combination thereof may be adoptable.

When the processing circuit 1102B is dedicated hardware, the above corresponding processing is realized by operating the processing circuit 1102B. The above corresponding processing may be realized by separate circuits or may be realized by a single circuit.

Note that the above corresponding processing may be realized partially in the processing circuit 1102A in which the program stored in the storage device 1103 is executed, and may be realized partially in the processing circuit 1102B, which is the dedicated hardware.

Effects Produced by Embodiments Described Above

Next, an example of the effects produced by the above Embodiments will be described. In the following description, although the effects are described based on the specific configuration described in above Embodiments, to the extent that the same effects are produced, such a specific configuration may be replaced with a specific configuration other than the configuration described in the present specification.

Further, the replacement may be made across a plurality of Embodiments. That is, a case in which similar effects are produced by combining respective configurations whose examples are described in different Embodiments may be adoptable.

According to Embodiments described above, the energy management system for managing charging/discharging of the storage battery of the vehicle (for example, the EV 105) equipped with the storage battery includes the schedule management unit 203 (or the schedule management unit 203*a*), and the charging/discharging plan creation unit 205 (the charging/discharging plan creation unit 205*a*, or the charging/discharging plan creation unit 205*b*). The schedule management unit 203 manages the schedule for the EV 105 to move from a first facility being a facility where the storage battery is chargeable/dischargeable to a second facility being a facility where the storage battery is chargeable/dischargeable. Here, the first facility corresponds to, for example, the facility 102 or the facility 103. Also, the second facility corresponds to, for example, the facility 103 or the facility 102. The charging/discharging plan creation unit 205 creates the first charging/discharging plan being a charging/discharging plan for the storage battery in each of the facility 102 and the facility 103. Here, the charging/discharging plan creation unit 205 creates the first charging/discharging plan with which the storage battery discharges at the facility 102 while leaving moving power (that is, required power amount) being the power for the EV 105 to move from the facility 102 to the facility 103.

Further, according to above Embodiments, the energy management system includes the processing circuit 1102A that executes a program and the storage device 1103 that stores the program to be executed. Then, when the processing circuit 1102A executes the program, the following operations are realized.

That is, the schedule for the EV 105 to move from the facility 102 being a facility where the storage battery is chargeable/dischargeable, to the facility 103 being a facility where the storage battery is chargeable/dischargeable, is managed, and the first charging/discharging plan being a charging/discharging plan for the storage battery in each of the facility 102 and the facility 103 is created. Then, the first charging/discharging plan is created with which the storage battery discharges at the facility 102 while leaving the moving power being the power for the EV 105 to move from the facility 102 to the facility 103.

Further, according to Embodiments described above, the energy management system includes the processing circuit 1102B being dedicated hardware. Then, the processing circuit 1102B being dedicated hardware, performs the following operations.

That is, the processing circuit 1102B being dedicated hardware manages the schedule for the EV 105 to move from the facility 102 being a facility where the storage battery is chargeable/dischargeable, to the facility 103 being a facility where the storage battery is chargeable/dischargeable, and creates the first charging/discharging plan being a charging/discharging plan for the storage battery in each of the facility 102 and the facility 103. Then, the first charging/discharging plan is created with which the storage battery discharges at the facility 102 while leaving the moving power being the power for the EV 105 to move from the facility 102 to the facility 103.

According to such a configuration, a charging/discharging plan when a vehicle including a storage battery is chargeable/dischargeable at a plurality of facilities is created. According to the charging/discharging plan, a discharging profit generated by the discharge is gained while securing the moving power for moving between a plurality of facilities.

In addition, when at least one of the configurations other than the configurations described in the present specification is appropriately added to the configuration described above, that is, even if a configuration that has not been described as a configuration described above and is a configuration other than the configuration described in the present specification is appropriately added, similar effects can be produced.

Further, according to Embodiments described above, the energy management system includes the facility information management unit 204 (or, facility information management unit 204*b*) that manages the power unit price information being information including the power unit price at each time of day of the respective facility 102 and facility 103. Then, based on the power unit price information, the charging/discharging plan creation unit 205 creates the first charging/discharging plan with which a value obtained by subtracting a total discharging profit generated by a discharge of the storage battery at the facility 102 and the facility 103 from a total charging cost generated by a charge of the storage battery at the facility 102 and the facility 103 is minimized. According to such a configuration, the total power cost can be suppressed in consideration of differences in power unit price among a plurality of facilities while securing the moving power for moving between a plurality of facilities. Specifically, by creating the charging/discharging plan with which the maximum profit due to the difference between the charging price and the discharging price by discharging the power charged at a lower price at a higher price; therefore, the total power cost due to charging/discharging by the EV user can be reduced.

Further, according to Embodiments described above, the energy management system includes a power estimation unit and the power unit price determination unit 210. Here, the power estimation unit corresponds to, for example, the facility power estimation unit 209. The facility power estimation unit 209 estimates the power demand at each of the facility 102 and the facility 103. Further, the power unit price determination unit 210 determines the power unit price based on the power demand. According to such a configuration, the power unit price is determined based on the power demand, so that a highly accurate charging/discharging plan can be created.

Further, according to Embodiments described above, the facility power estimation unit 209 estimates the power demand based on the power consumption of equipment provided in each of the facility 102 and the facility 103, and the power generation amount of the renewable energy equipment provided in at least one of the facility 102 and the facility 103. According to such a configuration, the power unit price can be determined in accordance with the power consumption of each facility and the power generation amount of the renewable energy equipment provided in each facility.

Also, according to Embodiments described above, the schedule management unit 203 manages a planned arrival time being the time when the EV 105 is planned to arrive at each of the facility 102 and the facility 103, and a planned departure time being the time when the EV 105 is planned to depart from each of the facility 102 and the facility 103. According to such a configuration, a charging/discharging plan when a vehicle including a storage battery is chargeable/dischargeable at a plurality of facilities is created. According to the charging/discharging plan, a discharging profit generated by the discharge is gained while securing the moving power for moving between a plurality of facilities.

Further, according to Embodiments described above, the energy management system includes a power calculation unit. Here, the power calculation unit corresponds to, for example, the power consumption amount calculation unit 207. The power consumption amount calculation unit 207 calculates the moving power based on at least the planned departure time from the facility 102 and the planned arrival time at the facility 103. Then, the charging/discharging plan creation unit 205*a* creates the first charging/discharging plan with which the storage battery discharges in the facility 102 while leaving the moving power calculated in the power calculation unit 207. According to such a configuration, the reduction in the burden for the EV user entailed in the setting of the schedule (specifically, calculation of the moving power) is ensured; therefore, the convenience for the EV user can be improved.

Further, according to Embodiments described above, the energy management system includes a schedule change unit, a power cost calculation unit, and a schedule presentation unit. Here, the schedule change unit corresponds to, for example, the presentation charging/discharging plan creation unit 211. Also, the power cost calculation unit corresponds to, for example, the presentation charging/discharging plan creation unit 211. Further, the schedule presentation unit corresponds to, for example, the usage schedule presentation unit 212. The presentation charging/discharging plan creation unit 211 changes at least one of the planned arrival time and the planned departure time managed by the schedule management unit 203. Based on at least one of the changed planned arrival time and the planned departure time, the presentation charging/discharging plan creation unit 211 creates the second charging/discharging plan with which a value obtained by subtracting a total discharging profit generated by a discharge of the storage battery at the facility 102 and the facility 103 from a total charging cost generated by a charge of the storage battery at the facility 102 and the facility 103 is minimized. The presentation charging/discharging plan creation unit 211 calculates the total power costs in the created first charging/discharging plan and the created second charging/discharging plan, respectively. When the total power cost in the second charging/discharging plan is lower than the total power cost in the first charging/discharging plan, the usage schedule presentation unit 212 presents the schedule corresponding to the second charging/discharging plan. According to such a configuration, by presenting a usage schedule with which the total power cost can be reduced than the total power cost of the usage schedule set by the EV user, the total power cost due to charging/discharging by the EV user can be further reduced.

Further, according to Embodiments described above, the energy management system includes the vehicle information management unit 202. The vehicle information management unit 202 manages vehicle information being information including the storage capacity of the storage battery, the chargeable/dischargeable capacity of the storage battery, and the charging/discharging efficiency of the storage battery. Then, based on the vehicle information, the charging/discharging plan creation unit 205 creates the first charging/discharging plan with which a value obtained by subtracting a total discharging profit generated by a discharge of the storage battery at the facility 102 and the facility 103 from a total charging cost generated by a charge of the storage battery at the facility 102 and the facility 103 is minimized. According to such a configuration, a charging/discharging plan when a vehicle including a storage battery is chargeable/dischargeable at a plurality of facilities is created. According to the charging/discharging plan, a discharging profit generated by the discharge is gained while securing the moving power for moving between a plurality of facilities.

Further, according to Embodiments described above, the energy management system includes the charging/discharging plan notification unit 206 that notifies of created first charging/discharging plan. According to such a configuration, availability of the charging/discharging plan for the EV user at the EV 105 and each facility leads to convenience.

According to Embodiments described above, in an energy management method for managing charging/discharging of a storage battery of the EV 105 equipped with the storage battery, the schedule for the EV 105 to move from the facility 102 being a facility where the storage battery is chargeable/dischargeable, to the facility 103 being a facility where the storage battery is chargeable/dischargeable, is managed. Then, the first charging/discharging plan being a charging/discharging plan for the storage battery in each of the facility 102 and the facility 103, is created. Here, the first charging/discharging plan is created with which the storage battery discharges at the facility 102 while leaving the moving power being the power for the EV 105 to move from the facility 102 to the facility 103.

According to such a configuration, a charging/discharging plan when a vehicle including a storage battery is chargeable/dischargeable at a plurality of facilities is created. According to the charging/discharging plan, a discharging profit generated by the discharge is gained while securing the moving power for moving between a plurality of facilities.

In addition, when at least one of the configurations other than the configurations described in the present specification is appropriately added to the configuration described above, that is, even if a configuration that has not been described as a configuration described above and is a configuration other than the configuration described in the present specification is appropriately added, similar effects can be produced.

Further, the order in which each process is performed can be changed unless otherwise specified.

Modifications in Embodiments Described Above

Although in Embodiments described above, the qualities of materials of, materials of, dimensions of, shapes of, relative arrangement relationships, or conditions of implementation of each component may also be described, they are illustrative in all aspects and are not limited to those described herein.

Accordingly, it is understood that numerous other modifications variations, and equivalents can be devised without departing from the scope of the invention. For example, a case where modifying at least one component, a case where adding or omitting components, and further, a case where extracting at least one component in at least one Embodiment and combining it with a component of another Embodiment are included.

Further, "one or more" may be included as a component described as "one" in Embodiments described above, so far as consistent with Embodiments.

Furthermore, each component in Embodiments described above is a conceptual unit, and within the scope of the technology disclosed in the present specification, a case where one component is composed of a plurality of structures, a case where one component corresponds to a part of a structure, and further, a case where a plurality of components are provided in one structure are included.

Further, each component in Embodiments described above includes a structure having another structure or shape as long as the same function is exhibited.

Also, the descriptions in the present specification are referred for the every object related to the technique, and none of them are regarded as conventional techniques.

Further, it is understood that each component described in Embodiments described above is assumed as software or firmware, or as hardware corresponding thereto as well, and in both concepts, each component is referred to "unit", or "processing circuit" or the like.

Furthermore, the technique disclosed in the present specification may be a case where each component is distributed and provided in a plurality of devices, specifically, a mode such as a system.

EXPLANATION OF REFERENCE SIGNS 101, 101a, 101b, 101c, energy management system, 102, 103 facility, 104 charging/discharging unit, 105 EV, 201 vehicle information reception unit, 202 vehicle information management unit, 203, 203a, 1001 schedule management unit, 204, 204b facility information management unit, 205, 205a, 205b, 1002 charging/discharging plan creation unit, 206 charging/discharging plan notification unit, 207 power consumption amount calculation unit, 208 measurement value management unit, 209 facility power estimation unit, 210 power unit price determination unit, 211 presentation charging/discharging plan creation unit, 212 usage schedule presentation unit, 1102A, 1102B processing circuit, 1103 storage device.

The invention claimed is:

1. An energy management system for managing charging/discharging of a storage battery of a vehicle equipped with the storage battery, comprising:
   one or more processor to execute a program; and
   one or more memory to store the program which, when it is executed by the processor, causes the processor to perform processes comprising:
   managing a schedule for the vehicle to move from a first facility being a facility at which the storage battery is chargeable/dischargeable, to a second facility being a facility at which the storage battery is chargeable/dischargeable; and
   creating a first charging/discharging plan being a charging/discharging plan for the storage battery at each of the first facility and the second facility, wherein
   the creating the first charging/discharging plan creates the first charging/discharging plan with which the storage battery discharges at the first facility while leaving moving power being power for the vehicle to move from the first facility to the second facility, the processes further comprising:
managing power unit price information being information including a power unit price at each time of the vehicle at the first facility and the second facility; and
electronically notifying the created first charging/discharging plan to a dedicated controllable application to charge/discharge the storage battery of the vehicle according to the created first charging/discharging plan, wherein
the creating the first charging/discharging plan creates the first charging/discharging plan with which a value obtained by subtracting a total discharging profit generated by a discharge of the storage battery at the first facility and the second facility from a total charging cost generated by a charge of the storage battery at the first facility and the second facility is minimized, based on the power unit price information.

2. The energy management system according to claim 1, the processes further comprising:
estimating a power demand at each of the first facility and the second facility; and determining the power unit price based on the power demand.

3. The energy management system according to claim 2, wherein the estimating the power demand estimates the power demand based on a power consumption of equipment provided each of the first facility and the second facility and a power generation amount of renewable energy equipment provided in at least one of the first facility and second facility.

4. The energy management system according to claim 1, wherein the managing the schedule manages a planned arrival time being a time at which the vehicle is planned to arrive at the first facility and the second facility, respectively, and a planned departure time being a time at which the vehicle is planned to depart from the first facility and the second facility, respectively.

5. The energy management system according to claim 4, the processes further comprising:
calculating the moving power based on, at least the planned departure time from the first facility and the planned arrival time to the second facility, wherein
the creating the first charging/discharging plan creates the first charging/discharging plan with which the storage battery discharges at the first facility while leaving the calculated moving power.

6. The energy management system according to claim 1, wherein the dedicated controllable application runs on charging/discharging control circuitry at each of the first facility and the second facility.

7. An energy management system for managing charging/discharging of a storage battery of a vehicle equipped with the storage battery, comprising:
one or more processor to execute a program; and
one or more memory to store the program which, when it is executed by the processor, causes the processor to perform processes comprising:
managing a schedule for the vehicle to move from a first facility being a facility at which the storage battery is chargeable/dischargeable, to a second facility being a facility at which the storage battery is chargeable/dischargeable; and
creating a first charging/discharging plan being a charging/discharging plan for the storage battery at each of the first facility and the second facility, wherein
the creating the first charging/discharging plan creates the first charging/discharging plan with which the storage battery discharges at the first facility while leaving moving power being power for the vehicle to move from the first facility to the second facility, and
the managing the schedule manages a planned arrival time being a time at which the vehicle is planned to arrive at the first facility and the second facility, respectively, and a planned departure time being a time at which the vehicle is planned to depart from the first facility and the second facility, respectively,
the processes further comprising:
changing at least one of the planned arrival time and the planned departure time, wherein
the changing at least one of the planned arrival time and the planned departure time creates a second charging/discharging plan with which a value obtained by subtracting a total discharging profit generated by a discharge of the storage battery at the first facility and the second facility from a total charging cost generated by a charge of the storage battery at the first facility and the second facility is minimized based on the at least one of the planned arrival time and the planned departure time that have been changed,
the processes further comprising:
calculating total power costs for the created first charging/discharging plan and the created second charging/discharging plan, respectively;
presenting the schedule corresponding to the second charging/discharging plan under a condition where the total power cost for the second charging/discharging plan is lower than the total power cost for the first charging/discharging plan; and
electronically notifying the created first charging/discharging plan or the created second charging/discharging plan to a dedicated controllable application to charge/discharge the storage battery of the vehicle according to the created first charging/discharging plan depending upon whether the condition where the total power cost for the second charging/discharging plan is lower than the total power cost for the first charging/discharging plan.

8. The energy management system according to claim 7, the processes further comprising:
calculating the moving power based on, at least the planned departure time from the first facility and the planned arrival time to the second facility, wherein
the creating the first charging/discharging plan creates the first charging/discharging plan with which the storage battery discharges at the first facility while leaving the moving power calculated in the power calculation unit.

9. The energy management system according to claim 7, wherein the dedicated controllable application runs on charging/discharging control circuitry at each of the first facility and the second facility.

10. An energy management system for managing charging/discharging of a storage battery of a vehicle equipped with the storage battery, comprising:
one or more processor to execute a program; and
one or more memory to store the program which, when it is executed by the processor, causes the processor to perform processes comprising:
managing a schedule for the vehicle to move from a first facility being a facility at which the storage battery is chargeable/dischargeable, to a second facility being a facility at which the storage battery is chargeable/dischargeable; and creating a first charging/discharging plan being a charging/discharging plan for the storage battery in each of the first facility and the second facility, wherein the creating the first charging/discharging plan creates the first charging/discharging plan with which the storage battery discharges at the first facility while leaving moving power being power for the vehicle to move from the first facility to the second facility, the processes further comprising:

managing vehicle information being information including a storage capacity of the storage battery, a chargeable/dischargeable capacity of the storage battery, and charging/discharging efficiency of the storage battery; and electronically notifying the created first charging/discharging plan to a dedicated controllable application to charge/discharge the storage battery of the vehicle according to the created first charging/discharging plan, wherein the creating the first charging/discharging plan creates the first charging/discharging plan with which a value obtained by subtracting a total discharging profit generated by a discharge of the storage battery at the first facility and the second facility from a total charging cost generated by a charge of the storage battery at the first facility and the second facility is minimized, based on the vehicle information.

11. The energy management system according to claim 10, wherein the managing the schedule manages a planned arrival time being a time at which the vehicle is planned to arrive at the first facility and the second facility, respectively, and a planned departure time being a time at which the vehicle is planned to depart from the first facility and the second facility, respectively.

12. The energy management system according to claim 11, the processes further comprising:

calculating the moving power based on, at least the planned departure time from the first facility and the planned arrival time to the second facility, wherein the creating the first charging/discharging plan creates the first charging/discharging plan with which the storage battery discharges at the first facility while leaving the moving power calculated in the power calculation unit.

13. The energy management system according to claim 10, wherein the dedicated controllable application runs on charging/discharging control circuitry of a mobile electronic device of an operator of the vehicle.

14. An energy management method of managing charging/discharging of a storage battery of a vehicle equipped with the storage battery, the energy management method comprising:

managing a schedule for the vehicle to move from a first facility being a facility at which the storage battery is chargeable/dischargeable, to a second facility being a facility at which the storage battery is chargeable/dischargeable;

creating a first charging/discharging plan being a charging/discharging plan for the storage battery in each of the first facility and the second facility, the creating the first charging/discharging plan is such that the storage battery discharges at the first facility while leaving moving power being power for the vehicle to move from the first facility to the second facility;

managing power unit price information being information including a power unit price at each time of the first facility and the second facility; and electronically notifying the created first charging/discharging plan to a dedicated controllable application to charge/discharge the storage battery of the vehicle according to the created first charging/discharging plan, wherein the creating the first charging/discharging plan creates the first charging/discharging plan with which a value obtained by subtracting a total discharging profit generated by a discharge of the storage battery at the first facility and the second facility from a total charging cost generated by a charge of the storage battery at the first facility and the second facility is minimized, based on the power unit price information.

15. The energy management method according to claim 14, wherein the dedicated controllable application runs on charging/discharging control circuitry of a mobile electronic device of an operator of the vehicle.

\* \* \* \* \*